(12) United States Patent
Nakajima

(10) Patent No.: US 7,619,797 B2
(45) Date of Patent: Nov. 17, 2009

(54) OPTICAL SCANNING APPARATUS AND IMAGE FORMING APPARATUS

(75) Inventor: Tomohiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/251,360

(22) Filed: Oct. 14, 2008

(65) Prior Publication Data

US 2009/0115834 A1   May 7, 2009

Related U.S. Application Data

(63) Continuation of application No. 11/356,031, filed on Feb. 17, 2006, now Pat. No. 7,453,615.

(30) Foreign Application Priority Data

Feb. 21, 2005   (JP) ............................. 2005-044538

(51) Int. Cl.
 *G02B 26/08* (2006.01)
(52) U.S. Cl. ..................... 359/198.1; 347/263
(58) Field of Classification Search ... 359/196.1–226.3, 359/820, 871; 347/232–233, 235, 241–245, 347/250, 257–261, 138, 170, 263
See application file for complete search history.

(56) References Cited

U.S. PATENT DOCUMENTS 5,793,408 A * 8/1998 Nakajima ................... 347/259

| 6,347,003 | B1 | 2/2002 | Shiraishi et al. |
| 2003/0090563 | A1 | 5/2003 | Tomita et al. |
| 2004/0036936 | A1 | 2/2004 | Nakajima et al. |
| 2004/0085605 | A1 | 5/2004 | Yoshizawa |
| 2004/0100550 | A1 | 5/2004 | Bannai et al. |
| 2004/0100673 | A1 | 5/2004 | Sakai et al. |

FOREIGN PATENT DOCUMENTS

| JP | 2536711 | 2/1997 |
| JP | 2002-127497 | 5/2002 |
| JP | 2002-169353 | 6/2002 |
| JP | 2002-311369 | 10/2002 |
| JP | 2003-195206 | 7/2003 |

* cited by examiner

*Primary Examiner*—Stephone B Allen
*Assistant Examiner*—Jennifer L Doak
(74) *Attorney, Agent, or Firm*—Dickstein Shapiro LLP

(57) ABSTRACT

An optical scanning apparatus includes a housing that positions and holds a plurality of light sources emitting light beams, a deflection mirror that deflects the light beams to perform main scanning, and at least one of optical image forming elements closest to the deflection mirror to form images on respective image carriers. A plurality of reflectors guide the light beams exiting the housing to the respective image carriers. A pair of support members face each other to support the housing in a main scanning direction. A support mechanism supports the reflectors by bridging the reflectors between the support members and also couples the support members to each other. Relative positions of the reflectors are arranged in a cross-sectional plane perpendicular to a main scanning direction between the support members.

15 Claims, 15 Drawing Sheets

OPTICAL SCANNING APPARATUS AND IMAGE FORMING APPARATUS

CROSS-REFERENCE TO RELATED APPLICATIONS

This application is a continuation of U.S. patent application Ser. No. 11/356,031, filed on Feb. 17, 2006, now U.S. Pat. No. 7,453,615 the subject matter of which is incorporated in its entirety by reference herein.

BACKGROUND OF THE INVENTION

1. Field of the Invention

The present invention generally relates to image forming apparatuses and optical scanning apparatuses and, more particularly, to an image forming apparatus such as a copy machine, a printer, a facsimile machine, a plotter or a combination machine of the aforementioned and an optical scanning apparatus used in such an image forming apparatus.

2. Description of the Related Art

In an image forming apparatus using a Carlzon process, latent-image formation, development and transfer are performed in association with rotation of a photosensitive drum. Accordingly, in a multiple-color image forming apparatus in which a plurality of photosensitive drums are arranged in a direction of conveying a transfer medium so as to overlap toner images formed by image forming stations of each color, unless an irradiating position of a light beam on each of the photosensitive drums is accurately aligned, a color shift or a color change may be generated, which causes deterioration of image quality.

Thus, as disclosed in Japanese Utility Model Publication No. 2536711 and Japanese Laid-Open Patent Application No. 2002-127497, light beams emitted by light sources corresponding to each color are scanned by being deflected by a single polygon scanner and a plurality of folding mirrors are provided so as to guide the light beams to respective photosensitive drums, and those components parts are integrally supported on a common housing so as to maintain positional accuracy between scan lines of each color. Thereby, it is configured and arranged to prevent a relative displacement with respect to irradiating positions of the light beams on each of the photosensitive drums.

Additionally, Japanese Laid-Open Patent Applications No. 2002-169353 and No. 2003-195206 disclose examples of arranging optical units for each color. In this those cases, similar to the above, positional accuracy between scanning lines of each color is maintained by positioning and supporting the optical units to a common side-plate frame.

As mentioned above, in a multiple-color image forming apparatus in which a plurality of image forming stations (hereinafter, simply referred to as stations) are arranged in a conveyance direction of a transfer member, such as a transfer belt or a conveyance belt for conveying recording papers so as to overlap colors, unless registration positions of toner images of the stations, which are transferred from the photosensitive drums to the transfer member, accurately overlap with each other, it causes a color displacement or a color change. Thus, in an optical scanning apparatus, the housing to which the image forming components including image forming stations are mounted is formed by a metal material such as an aluminum die-cast alloy.

However, there is a problem in that productivity is low and a cost is high since it takes time and labor to machine receiving surfaces of component parts. Thus, a plastic housing such as disclosed in Japanese Laid-Open Patent Application No. 2002-127497 has been used. However, the plastic housing is inferior to a metal housing in reliability over a long time. Since a stress is generated in the housing due to an environmental change, the above-mentioned plurality of folding mirrors tend to change in their relative positions and angles. Accordingly, an irradiating position on each of the photosensitive drums is displaced and a time taken from an irradiating position to a transfer position in each station, which causes a problem of occurrence of a registration displacement.

Thus, in a case where a predetermined temperature raise occurs or a number of continuously printed sheets exceeds a predetermined number, a job is interrupted to detect a registration displacement so as to readjust writing timings between the stations.

In order to detect the registration displacement, a detection pattern must be recorded on a transfer member. Thus, during such a time period, it is set to a recording unable state, which elongates print wait time and results in deterioration in operation. Additionally, if a number of corrections is increased, an amount of consumption of the waist toner is increased. Thus, it is desirous to avoid the correction from being frequently performed.

Especially, if a distance between the stations is increased, the housing is enlarged due to thermal expansion, and, thereby, a warp tends to be generated in the housing, which results in difficulty in acquiring dimensional stability. Additionally, since a thickness is increased inevitably and a mixing ratio of glass fibers is increased, productivity is deteriorated and a cost is increased even if a plastic material is used.

Additionally, since the housing becomes weak to a vibration in a direction perpendicular to a bottom surface, which propagates from a polygon motor or an external part, it is preferable to reduce the size of the housing as small as possible.

On the other hand, there is a method of raising rigidity using a metal sheet as disclosed in Japanese Laid-Open Patent Application No. 2002-311369. However, if an entire housing is made of a metal sheet, the configuration of the metal housing becomes complex to support a plurality of light sources and scanning lenses of the plurality of stations. Thus, there is a problem in that a number of fabrication processes is increased and assembling becomes troublesome, which results in an increase in cost.

Japanese Laid-Open Patent Applications No. 2002-169353 and No. 2003-195206 disclose examples of accommodating component parts in a plastic housing and position and support the component parts to a common metal sheet frame that constitutes a structural body of the apparatus body. However, there is a problem in that a positional accuracy cannot be maintained due to a stress applied to the framed is the installation surface of the apparatus body is not flat.

SUMMARY OF THE INVENTION

It is a general object of the present invention to provide an improved and useful optical scanning apparatus used in an image forming apparatus in which the above-mentioned problems are eliminated.

A more specific object of the present invention is to provide an image forming apparatus and an optical scanning apparatus used in such an image forming apparatus, which can perform formation and recording of a high-quality image including a color image without a color shift and color change by stably maintaining a registration accuracy of each station for a long time.

In order to achieve the above-mentioned objects, there is provided according to one aspect of the present invention an optical scanning apparatus comprising: a housing that positions and holds a plurality of light sources emitting light beams, a deflection mirror that deflects the light beams to perform main scanning, and at least one of optical image forming elements closest to the deflection mirror to form images on respective image carriers; a plurality of reflectors that guide the light beams exiting said housing to the respective image carriers; a pair of support members that face each other to support the housing in a main scanning direction; and a support frame that supports said reflectors by bridging the reflectors between the support members and also couples said support members to each other, wherein relative positions of the reflectors are arranged and aligned in a cross-sectional plane perpendicular to a main scanning direction between the support members.

It should be noted that the phrase "relative positions of the reflectors are arranged and aligned" includes not only aligning the relative position of the reflectors but also aligning or arranging the relative positions of the support members with each other or the relative positions of the image forming units other than at least the image forming unit closest to the deflection mirror.

The optical scanning apparatus according to the present invention may further comprise at least one another housing that positions and holds a plurality of light sources emitting light beams, a deflection mirror that deflects the light beams to perform main scanning, and at least one of optical image forming elements closest to the deflection mirror to form images on respective image carriers, and wherein the plurality of reflectors guide the light beams exiting said housing and said another housing to the respective image carriers.

In the optical scanning apparatus according to the present invention, each of the pair of support members may be formed of a metal sheet, and the reflectors may be supported by edge surfaces of the metal sheets perpendicular to the surfaces of the metal sheets. The edge surfaces may be formed by punching the metal sheets.

In the optical scanning apparatus according to the present invention, the support mechanism may include a coupling member formed of a material having the same coefficient of thermal expansion as that of the support members.

In the optical scanning apparatus according to the present invention, the housing may be supported so that positioning of the housing in the main scanning direction is performed by one of the pair of support members, and the other of the pair of support members supports the housing free from restraint in the main scanning direction.

In the optical scanning apparatus according to the present invention, each of the housing and the another housing may be supported so that positioning of each of the housing and the another housing in the main scanning direction is performed by one of the pair of support members, and the other of the pair of support members supports the housing free from restraint in the main scanning direction.

In the optical scanning apparatus according to the present invention, the support frame may include a partition member located between an interior of the housing and the image carriers, and openings may be formed in the partition member to pass the light beams traveling toward the image carriers therethrough.

In the optical scanning apparatus according to the present invention, each of the support members may have a step form so that there are different distances between the support members facing each other, and the housing may be supported by portions of the support members having a smallest distance therebetween.

Additionally, an optical detector may be provided to the support members so as to detect the light beams at detecting positions located outside support positions of the reflectors so that a write start timing is set in accordance with a result of detection of the optical beams scanned by the deflection mirror.

In the optical scanning apparatus according to the present invention, a warp-preventing member having a coefficient of thermal expansion smaller than that of the housing may be provided to the housing, the warp-preventing member being in engagement with the housing free from restraint in the main scanning direction.

In the optical scanning apparatus according to the present invention, the reflectors may be reflection mirrors.

Additionally, there is provided according to another aspect of the present invention an image forming apparatus for forming a color image, comprising; the above-mentioned optical scanning apparatus; and an image forming part that develops electrostatic latent images formed on the image carriers by the optical scanning apparatus by applying toners of different color toners corresponding to respective image carriers, and forms the color image by sequentially transferring and overlapping the developed toner images onto a transfer member so as to form the color image.

In the image forming apparatus for forming a color image according to the present invention, the recording member may be an intermediate transfer member so that the color image developed by the different color images and formed on the intermediate transfer member is transferred onto a sheet-like recording medium. Alternatively, the recording member may be a sheet-like recording medium carried by a movable carrier.

Other objects, features and advantages of the present invention will become more apparent from the following detailed description when read in conjunction with the accompanying drawings.

DETAILED DESCRIPTION OF THE PREFERRED EMBODIMENTS

Figure 1:
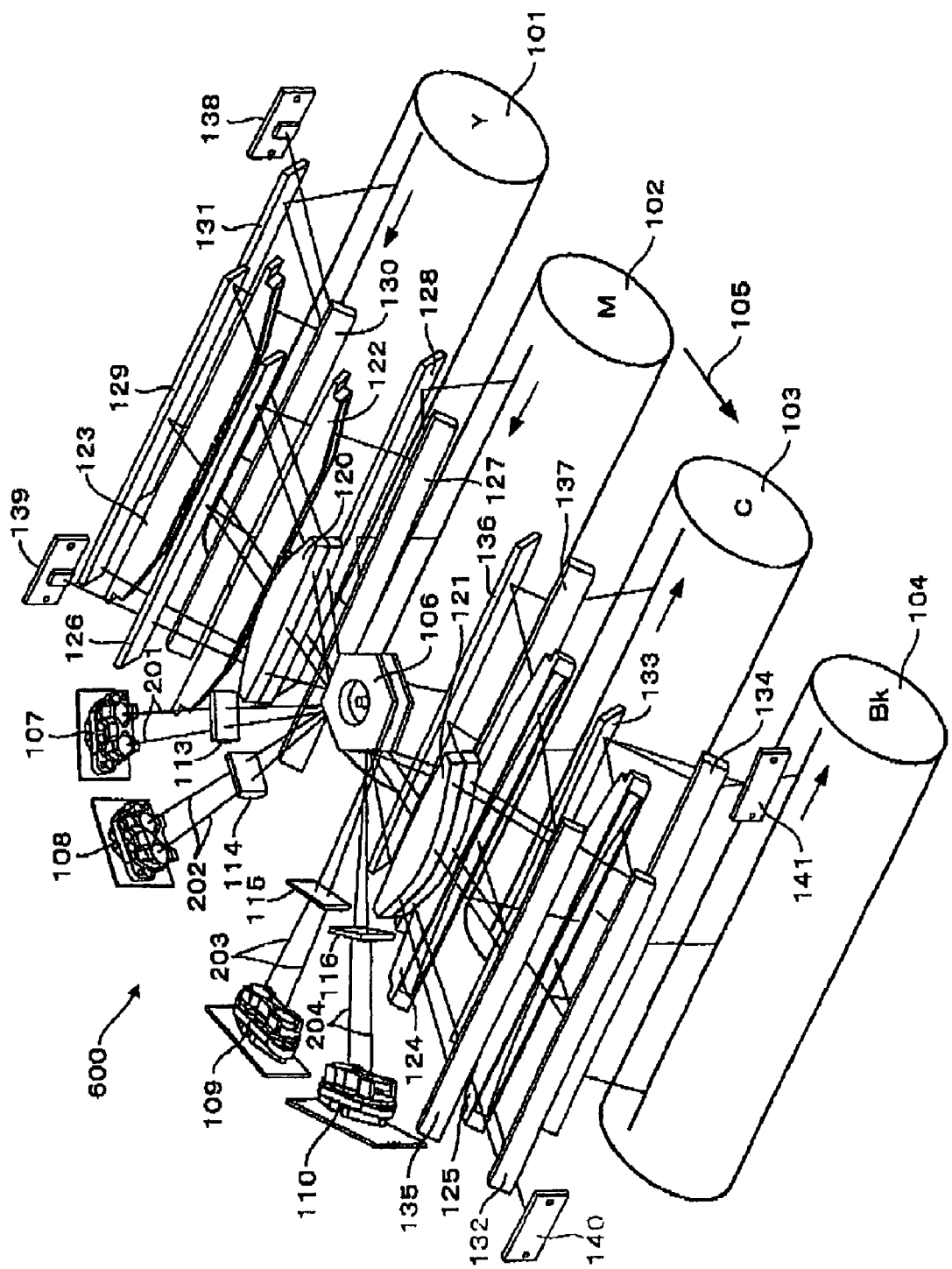
FIG. 1 is an exploded perspective view of a part of an optical scanning apparatus according to a first embodiment of the present invention.

A description will now be given, with reference to the drawings, of preferred embodiments of the present invention. In the description of the embodiments, parts that are the same as previously mentioned parts are given the same reference numerals and descriptions thereof will be omitted.

First Embodiment

A description will now be given, with reference to FIGS. 1 through 12, of a first embodiment of the present invention.

Figure 12:
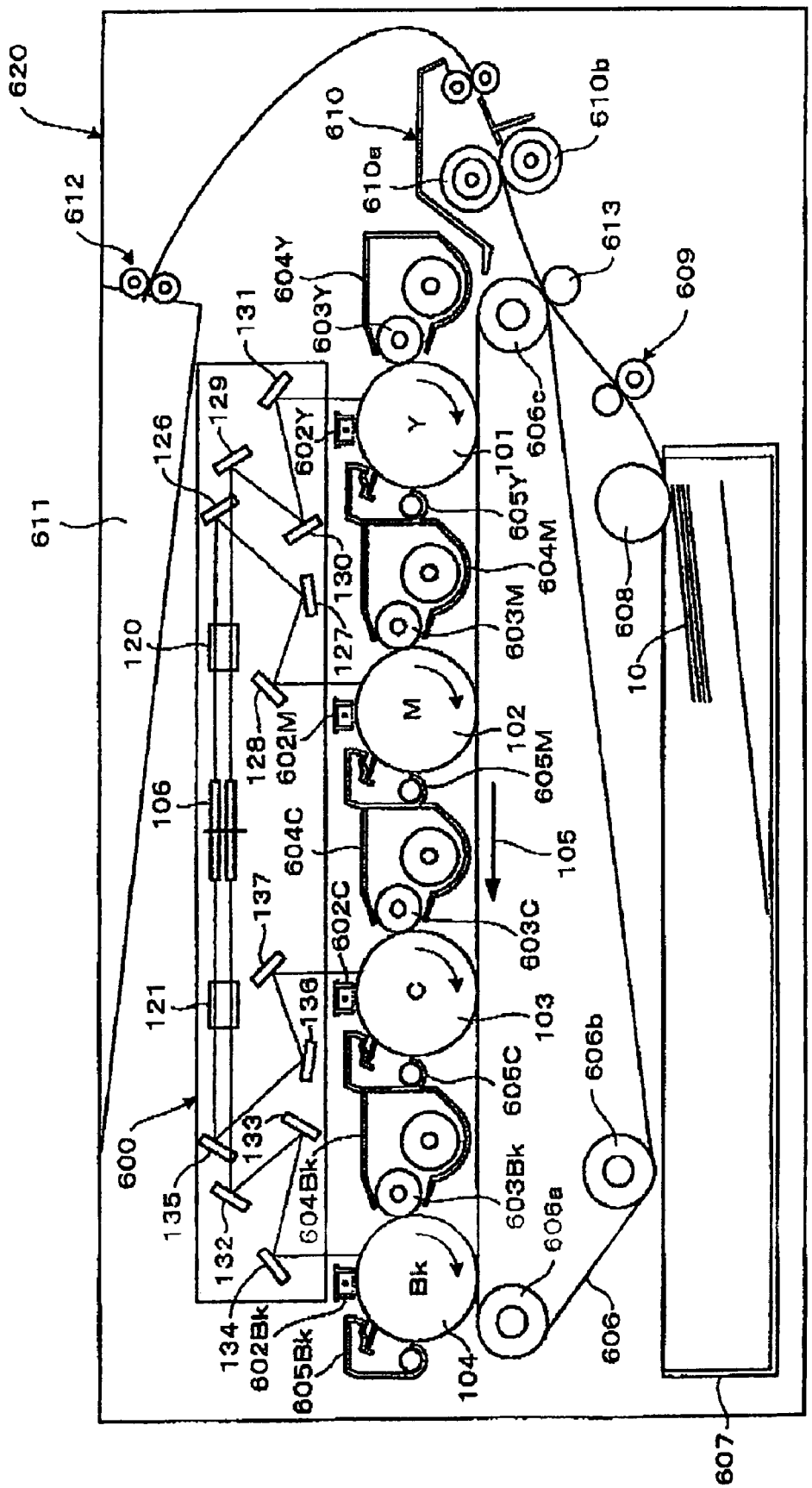
FIG. 12 is an illustration of an entire color image forming apparatus equipped with the optical scanning apparatus shown in FIG. 1.
Figure 13:
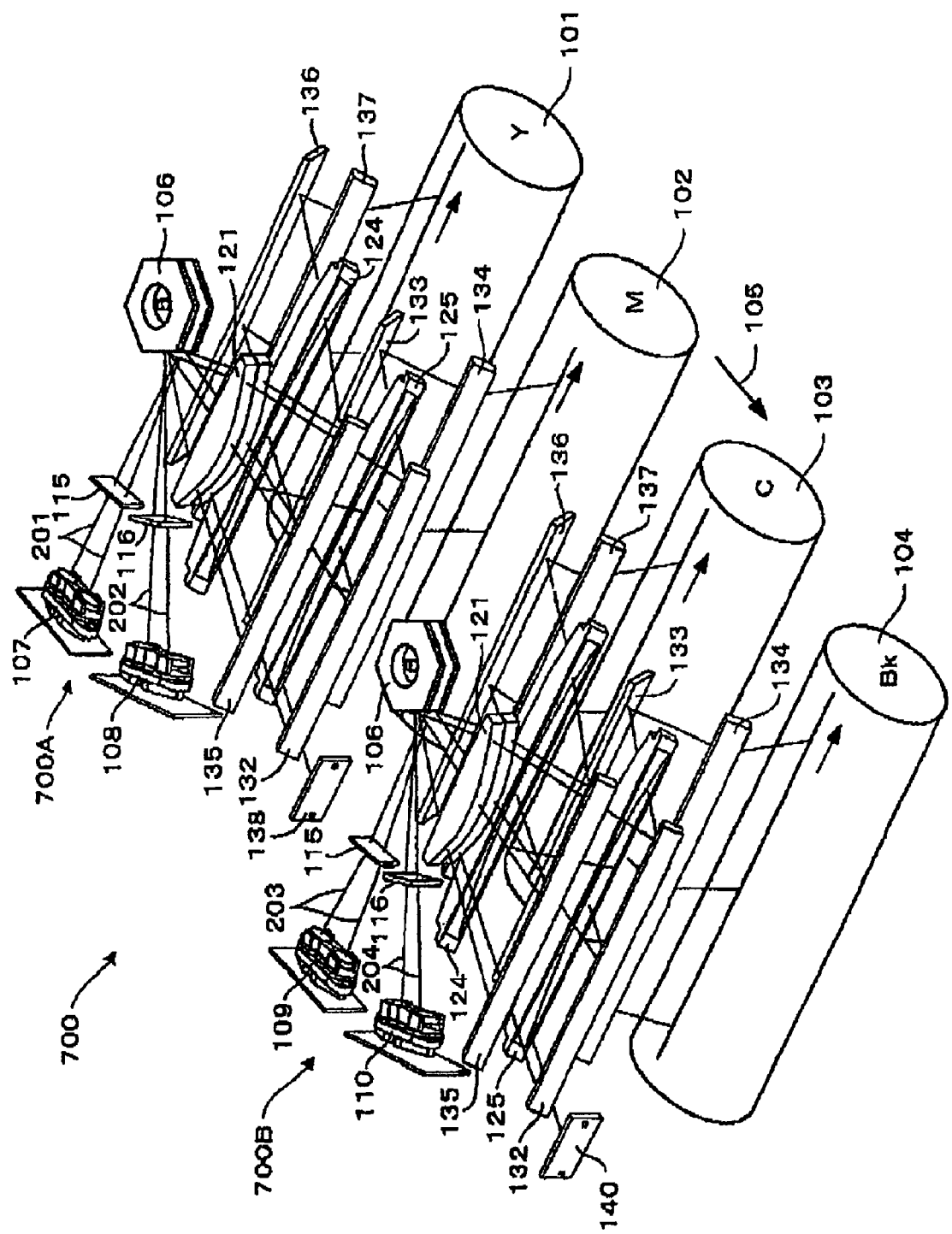
FIG. 13 is a perspective view of a part of an optical scanning apparatus according to a second embodiment of the present invention.
Figure 14:
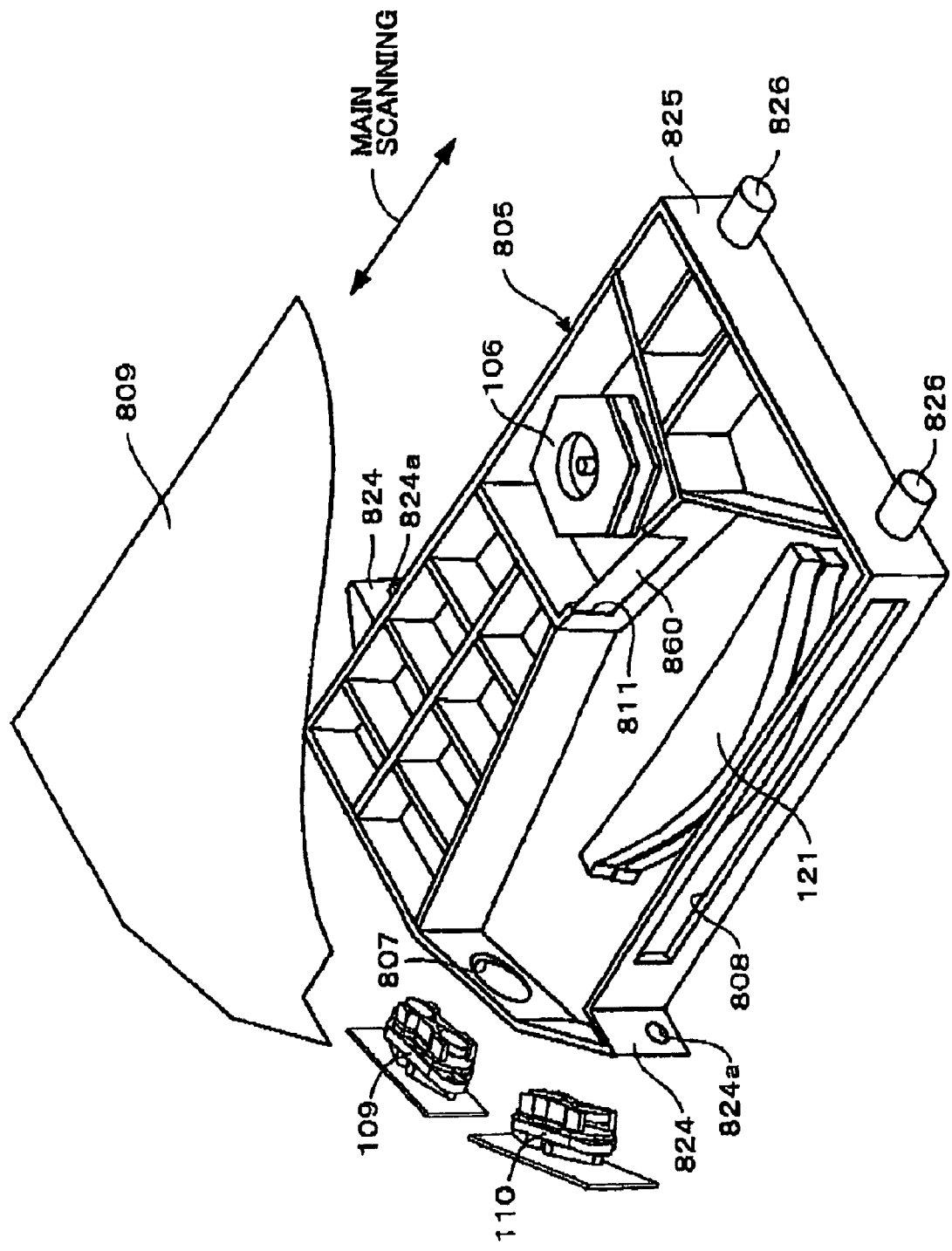
FIG. 14 is a perspective view of a housing accommodating light source units, a polygon mirror, fθ lenses, etc., of the optical scanning apparatus shown in FIG. 14.

First, a description will be given, with reference to FIG. 12, of an outline structure of a color image forming apparatus 620 equipped with an optical scanning apparatus 600.

The color image forming apparatus 620 comprises an intermediate transfer belt 606 as an intermediate transfer member. A plurality of image forming stations are arranged along a direction of movement of the intermediate transfer belt 606. The image forming stations includes photosensitive drums 101, 102, 103 and 104 as image carriers, respectively.

A yellow (Y) toner image is formed in the image forming station having the photosensitive drum 101. A magenta (M) toner image is formed in the image forming station having the photosensitive drum 102. A cyan (C) toner image is formed in the image forming station having the photosensitive drum 103. A black (Bk) toner image is formed in the image forming station having the photosensitive drum 104.

In the four image-forming stations, since the structure forming the toner image of each color differs from each other only in the toner color and has the same structural elements, a description will be given of the image forming station forming the yellow toner image as a representative.

In the image forming station for forming the yellow toner image, there are arranged around the photosensitive drum 101 a charger 602Y, a development roller 603Y, a development roller 604Y, a primary transfer roller (not shown in the figure), and a cleaning device 605Y. The charger 602Y serves as charging means to uniformly charge the surface of the photosensitive drum 101. The development roller 603Y develops an electrostatic latent image on the photosensitive drum 101, which is formed by the optical scanning apparatus 600, by applying a toner to the electrostatic latent image. The development apparatus 604Y serves as development means having a toner cartridge for supplying the yellow toner to the development roller 603Y. The primary transfer roller serves as primary transferring means for primary-transfer the toner image on the photosensitive drum 101 to the intermediate transfer belt 606. The cleaning device 605Y scraps the toner remaining on the photosensitive drum 101 after the transfer and stores the scraped toner. Other image forming stations have the same structure, and descriptions thereof will be omitted while adding suffixes indicating each color to the reference numerals. The suffixes indicating each color may be omitted to designate as a common structure.

The formation of the latent images corresponding to a plurality of lines (two-divided four lines in the present embodiment) on the photosensitive drums 101, 102, 103 and 104 by scanning in opposite directions by a single polygon mirror 106 as mentioned later.

The intermediate transfer belt 606 is engaged with and supported by three rollers 606a, 606b and 606c, and is rotated counterclockwise. The yellow, magenta, cyan and black toner images are sequentially transferred onto the intermediate transfer belt 606 at adjusted timings and are overlapped to form a color image.

A recording paper 10 as an example of a sheet-like recording medium is fed by a paper supply roller 608 one by one from an uppermost sheet in a paper supply tray 607. The recording paper is fed to a transfer part by a pair of registration rollers 609 at recording start timing in a sub-scanning direction.

The overlapped color image on the intermediate transfer belt 606 is transferred at once onto the recording paper 10 by a secondary transfer roller serving as secondary transferring means in the transfer part. The having the color image transferred thereon is fed to a fixation apparatus 610 serving as fixing means having a fixation roller 610a and a pressing roller 610b, and the color image is fixed by the fixation apparatus 610. The recording paper 10 after the fixation is completed is ejected and piled on a paper eject tray 611 formed on a top surface of the image forming apparatus body by a pair of paper eject rollers 612.

As shown in FIG. 1, the optical scanning apparatus 600 is of an opposite scanning type which scans in opposite main scanning directions by a single polygon mirror (deflection mirror) 106 by dividing four stations into two groups each contains two stations.

Four photosensitive drums 101, 102, 103, and 104 are arranged at equal intervals along the direction 105 of movement of the intermediate transfer member (refer to the intermediate transfer belt 606 shown in FIG. 12) currently omitted so as to form a color image by sequentially transferring and overlapping different color toner images on the intermediate transfer belt 606.

As shown in the figure, the optical scanning apparatus 600 which scans each of the photosensitive drums 101, 102, 103 and 104 is configured as an integrated body, and scans an optical beam by the polygon mirror 106 (rotatable multi-surface mirror) in opposite directions so as to write line images so that a write start position of one line coincides with a write end position of the other line.

The polygon mirror 106 is a six-faced mirror, and is formed as a two-step structure mounted to the same shaft so as to be a shape to reduce a windage loss by providing a groove to a middle portion which is not used for deflection so that the middle portion has a diameter slightly smaller than a diameter of an inscribing circle of the polygon mirror 106. A thickness of one layer of the polygon mirror 106 is about 2 mm. It should be noted that the phase of the upper and lower portions of the polygon mirror 106 are in the same phase.

The light source units 107, 108, 109 and 110 are attached to respective engaging holes 207 formed in a wall of the housing 205 so that a height of the light source units 108 and 109 is matched to the lower portion of the polygon mirror 106 and a height of the light source unit 107 and 110 is matched to the upper portion of the polygon mirror 106. A difference in height between the light source units 107 and 108 and the light source units 110 and 109 and a difference between the upper portion and the lower portion of the polygon mirror 106 are about 6 mm, respectively.

In the present embodiment, the light source unit is provided with a pair of semiconductor lasers as mentioned later so as to simultaneously scan two lines by shifting by one line pitch in the sub-scanning direction in accordance with a recording density. Thereby, the rotational speed of the polygon mirror 106 is one half of the image recording speed. The beams 201, 202, 203 and 204 from the light source units 107, 108, 109 and 110 are incident on the polygon mirror 106 in opposite directions in a sub-scanning cross-sectional plane containing a rotational axis, and deflected and scanned in two directions.

A description will be given of an optical path of one of the directions.

Each of cylinder lenses 113, 114, 115 and 116 has a first surface which is a cylindrical surface having a radius of curvature only in the sub-scanning direction and a flat second surface. The cylinder lens 114 forms a surface tilt correction optical system for making the deflection surface of the polygon mirror 106 and the surface of the photosensitive drum to conjugate with each other in the sub-scanning direction by being combined with a toroidal lens mentioned later so that each beam is converged in a line form in the sub-scanning direction.

Each of fθ lenses 120 and 121 has a first surface and a second surface each of which is a non-circular surface in the main scanning direction by being plastic-molded, and is formed in two-stage by joining or integral molding.

The cylinder lenses 113, 114, 115 and 116 and the fθ lenses 120 and 121 serve as image forming means and image forming elements in the present invention, respectively.

The beam 202 from the light source unit 108 is incident on the lower portion of the polygon mirror (deflection mirror) 106 via the cylinder lens 114, and deflected by the lower portion of the polygon mirror 106. Thereafter, the beam 202 passes through the lower lens of the fθ lens 120, and is reflected by a folding mirror 129 serving as a reflector or reflecting means, which changes the direction to an obliquely downward direction. Then, the beam 202 is reflected by folding mirrors 130 and 131 serving as reflectors or reflecting means and reaches the photosensitive drum 101 (image carrier) and forms a spot image on the photosensitive drum 101, thereby sequentially forming an electrostatic latent image. Thus, a yellow image is formed by the first image forming station.

The light source unit 107 is arranged by being radially shifted with respect to the light source unit 108 in the main scanning direction with an intersection of an optical axis extending line of the fθ lens 120 and the deflection surface of the polygon mirror 106. The beam 201 from the light source unit 107 has an incident angle to the polygon mirror 106 different from the beam 202 so that the beam 202 is incident on the upper portion of the polygon mirror 106 via the cylinder lens 113.

The beam 201 deflected by the upper portion of the polygon mirror 106 is reflected by a folding mirror 126 serving as reflecting means and the direction is changed to an obliquely downward direction. Then, the beam 201 is incident on a toroidal lens 122, and is reflected by folding mirrors 127 and 12B and reaches the photosensitive drum 102. The beam 201 forms a spot image on the photosensitive drum 102, thereby sequentially forming an electrostatic latent image on the photosensitive drum 102. Thus, a magenta image is formed by the second image forming station.

Optical paths from the light source units 109 and 110 to the respective photosensitive drums 104 and 103 are symmetrical to the above-mentioned optical paths with respect to the polygon mirror 106, and descriptions thereof will be omitted. The beam from the light source unit 109 is guided to the photosensitive drum 104 and forms a black image by the fourth image forming station. The beam from the light source unit 110 is guided to the photosensitive drum 103 and forms a cyan image by the third image forming station.

The toroidal lenses 122, 123, 124 and 125 serve as image forming means and image forming elements in the present invention.

Thus, in each color station (image forming station) is provided with a plurality of folding mirrors (three mirrors per One station in the present embodiment) so that the optical path lengths from the deflection surface of the polygon mirror 106 to the irradiating positions on the photosensitive drums as a surface to be scanned are coincident with each other and the incident positions and the incident angles to the photosensitive drums 101, 102, 103 and 104 are adjusted to be equal to each other. Thereby, each beam 201, 202, 203 and 204 is incident on the respective photosensitive drums 101, 102, 103 and 104 at the same angle.

The rotational angles of the photosensitive drums 101, 102, 103 and 104 from the irradiating positions of the beams 201, 202, 203 and 204 to the respective transfer positions are the same. It should be noted that the toroidal lenses 122 through 125 are commonly used, and the first surface is formed as a co-axis aspheric surface and a second surface is formed as a toroidal surface. As mentioned above, the photosensitive drums 101, 102, 103 and 104 sequentially form the images in correspondence with the image forming stations of yellow, magenta, cyan and black.

Figure 8:
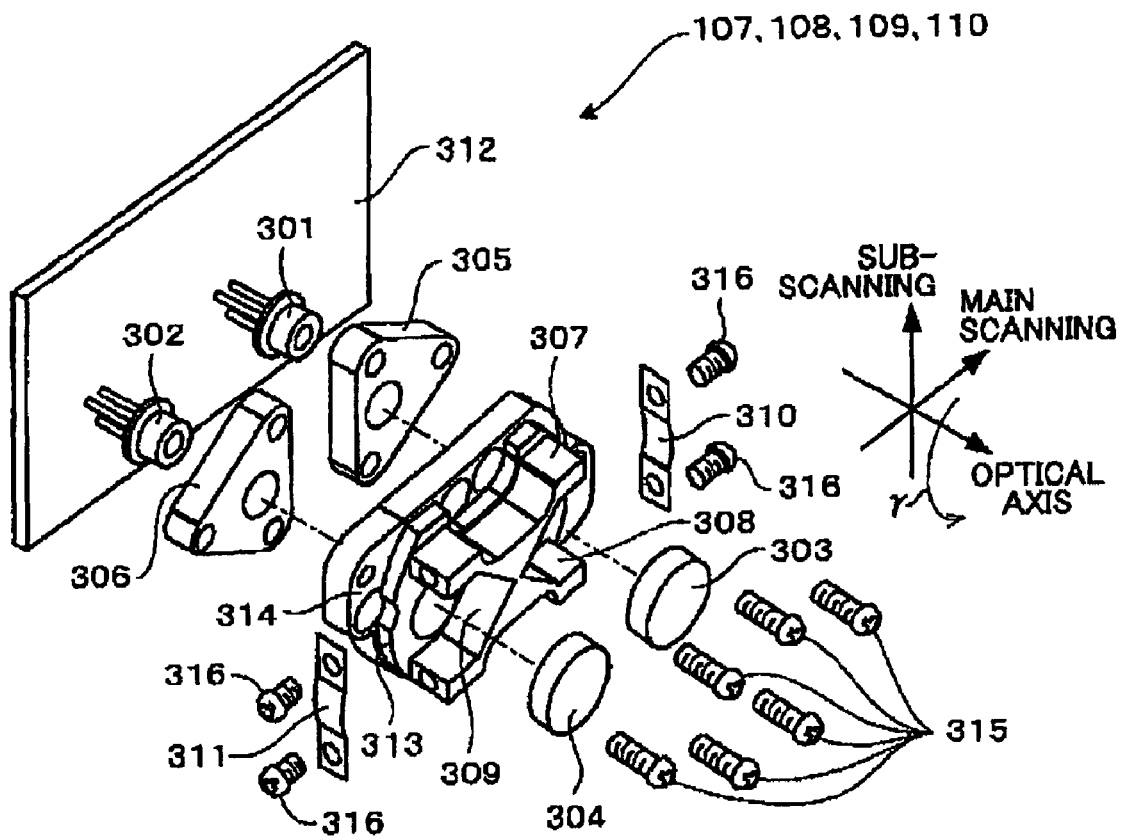
FIG. 8 is an exploded perspective view of a light source unit of the optical scanning apparatus shown in FIG. 1.

A description will now be given, with reference to FIG. 8, of the structure of the light source units. The light source units 107, 108, 109 and 110 have the same structure. The semiconductor lasers 301 and 302 as a light source means and the coupling lenses 303 and 304 as a light source means are arranged symmetrically in the main scanning direction with respect to the irradiation axis of each color scanning means. The semiconductor lasers 301 and 302 are press-fitted to respective base members 305 and 306 from backside thereof with outer surfaces of packages thereof being fitted.

In this case, the arrangement of the coupling lenses 303 and 304 on the contact surfaces (surfaces perpendicular to the optical axes) is adjusted so that the light emitting points of the semiconductor lasers 301 and 302 are located on the optical axes, respectively. Additionally, the locations of the base members 305 and 306 on V grooves (on the light axes) are adjusted and fixed so that the lights exiting from the coupling lenses 303 and 304 are made as parallel beams of light.

The optical axes of the lights are inclined so as to intersect with the exit axes, respectively. In the present embodiment, the inclination of the printed circuit board 312 as a support member is set so that the positions of the intersections are located in the vicinity of the reflecting surfaces of the polygon mirror 106.

The printed circuit board 312 on which a drive circuit is formed is attached to a table base protrudingly formed on a holder member 307, and lead terminals of the semiconductor lasers 301 and 302 are soldered by being inserted into through holes so that the light source units 107, 108, 109 and 110 are integrally formed.

It should be noted that although the plurality of semiconductor lasers are used in each of the light source units, a single semiconductor laser may be used, or a semiconductor array, which is formed by a plurality of light sources in a single monolithic chip, may be used.

Each of the light source units 107, 108, 109 and 110 is attached by screws by a contact surface 314 being brought into contact with an outer wall surface of the housing 205 by being positioned by inserting the cylindrical portion 313 of the holder member 307 into the respective one of the engaging holes 207 that are formed in the wall of the housing 205 at different heights.

Figure 9:
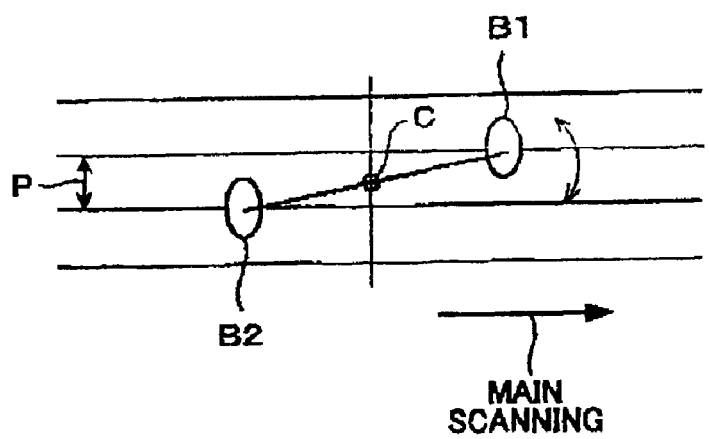
FIG. 9 is an illustration for explaining a method of adjusting an interval of beam spots to a scan line pitch corresponding to a recording density.

In this case, an interval between beam spots B1 and B2 can be adjusted to a scan line pitch P corresponding to a recording density by adjusting an amount of inclination gamma by using the cylindrical portion 313 as a reference. In FIG. 9, the sign C indicates the exit axis.

Figure 2:
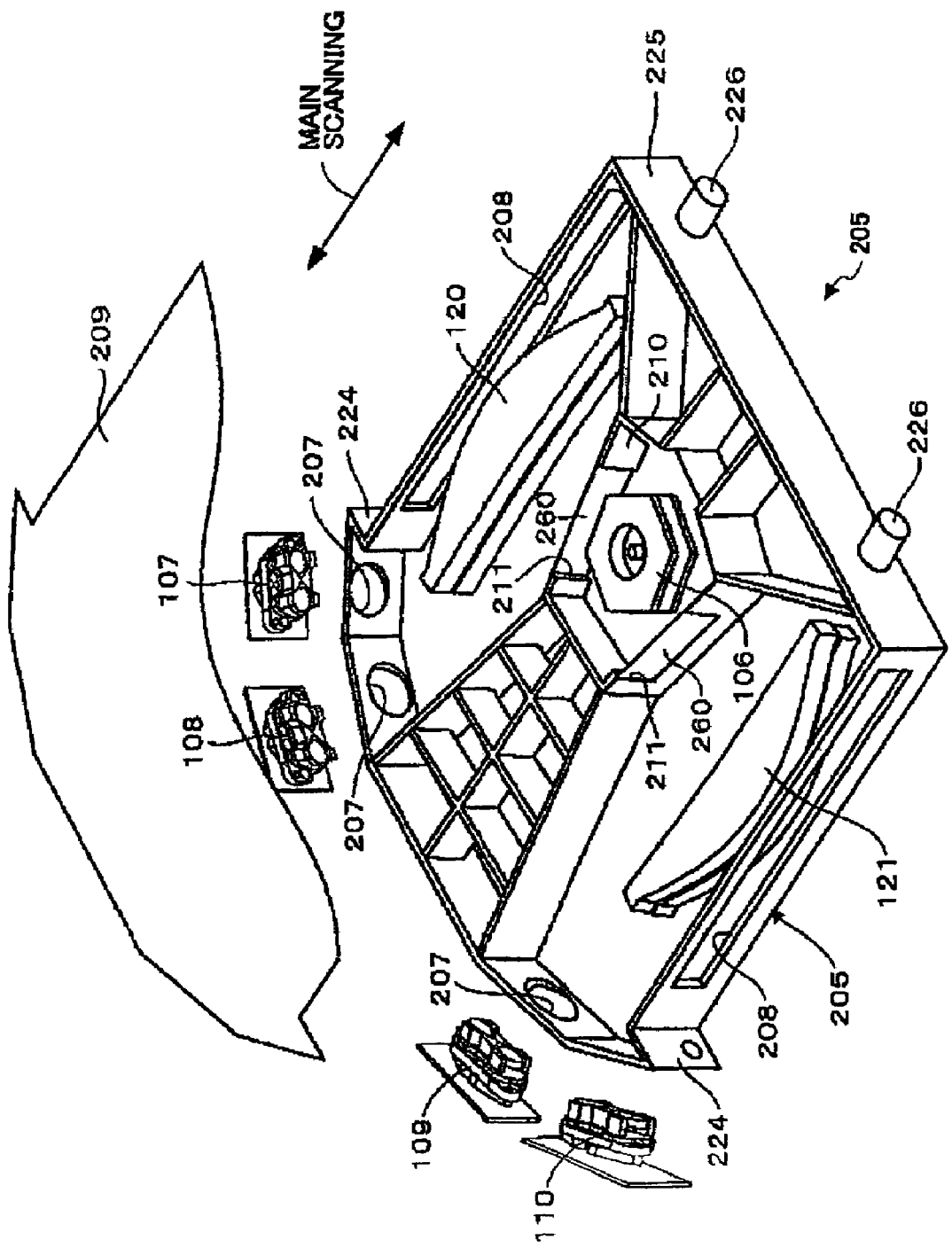
FIG. 2 is a perspective view of a housing accommodating light source units, a polygon mirror, fθ lenses, etc., of the optical scanning apparatus shown in FIG. 1.

A description will be given, with reference to FIG. 2, of the structure of the housing 205 in detail.

The above-mentioned optical elements constituting the optical system, such as the light source units 107, 10B, 109 and 110, the motor to which the polygon mirror 106 is attached, the cylinder lenses (omitted in FIG. 2), the fθ lenses 120 and 121, etc., are attached to the housing 205 at predetermined position, and are enclosed by a cover 209. The canned beams exit the housing 25 through the openings 208 formed on left and right longitudinal walls in the figure.

Each of the housing 205 and the cover 209 is integrally formed by a resin such as, for example, glass-fiber reinforced polycarbonate (PC) resin The coefficient of thermal expansion of the housing 205 made of the above-mentioned resin is about $2.5 \times 10^{-5}/°C$. The coefficient of thermal expansion of a steel plate is about $1.1 \times 10^{-5}/°C$. Accordingly, it is apparent that the coefficient of thermal expansion of the steel plate is much smaller than that of the above-mentioned resin.

The polygon mirror 106 is attached to the motor integrally formed with the board on which the drive circuit is formed, and is surrounded by walls 210 uprightly provided in the center portion of the housing 205. The polygon mirror 106 is enclosed in a compartment having cutout parts 211 to which transparent covers 260 are attached so that beams pass through the cutout parts 211. Thus, a viscosity resistance of air generated at a corner of the polygon mirror being rotated can be reduced, which provides effects of reducing a load and preventing generation of noise. Each beam passes through the transparent cover 260 when it is incident on and exits from the polygon mirror 106.

The cylinder lenses (not shown in the figure) and the fifth lenses 120 and 121 are positioned along and joined to ribs (not shown in the figure) protrudingly formed on the bottom surface of the housing 205.

Figure 4:
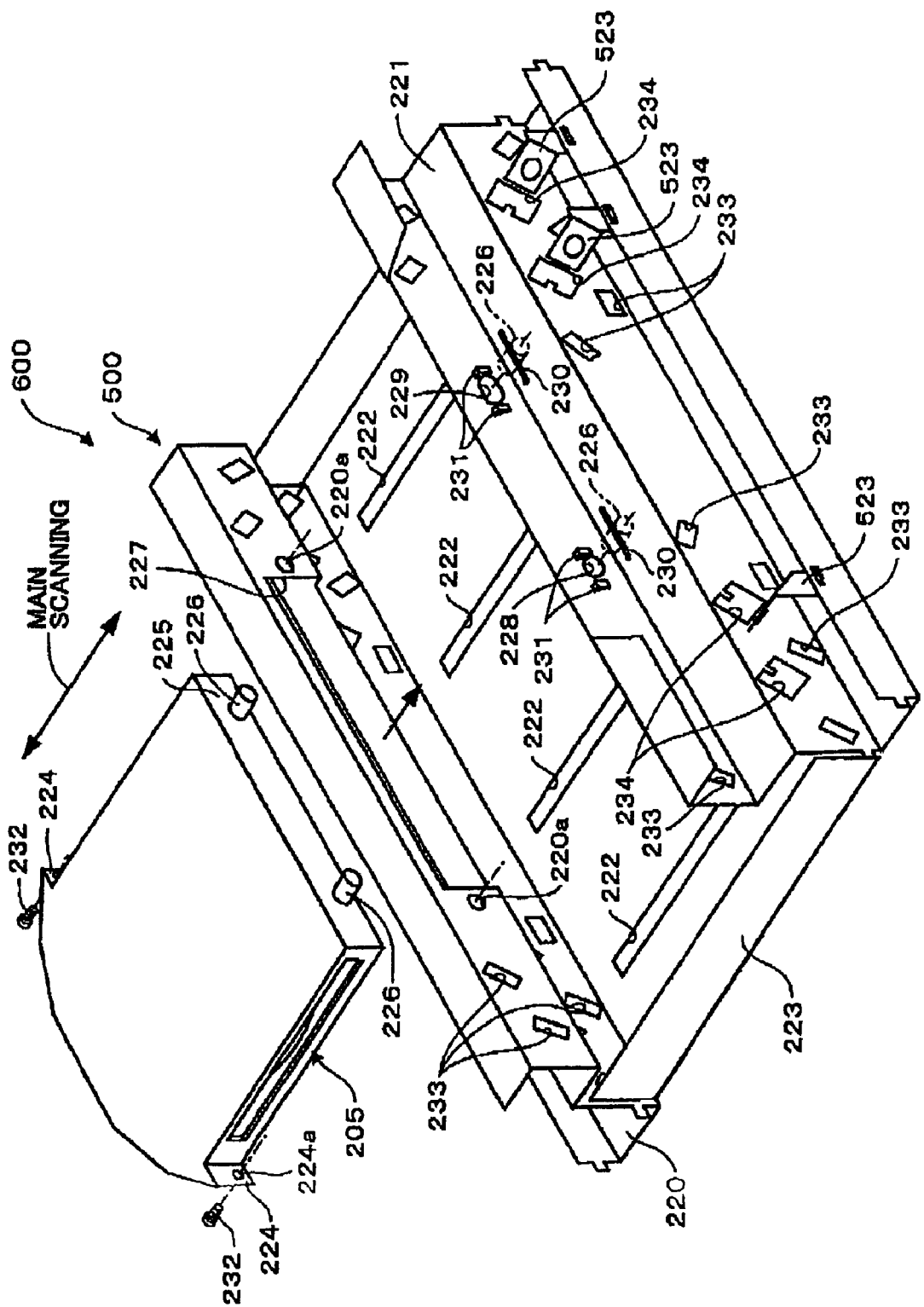
FIG. 4 is a perspective view of the frame and a housing to be attached to the frame.
Figure 11:
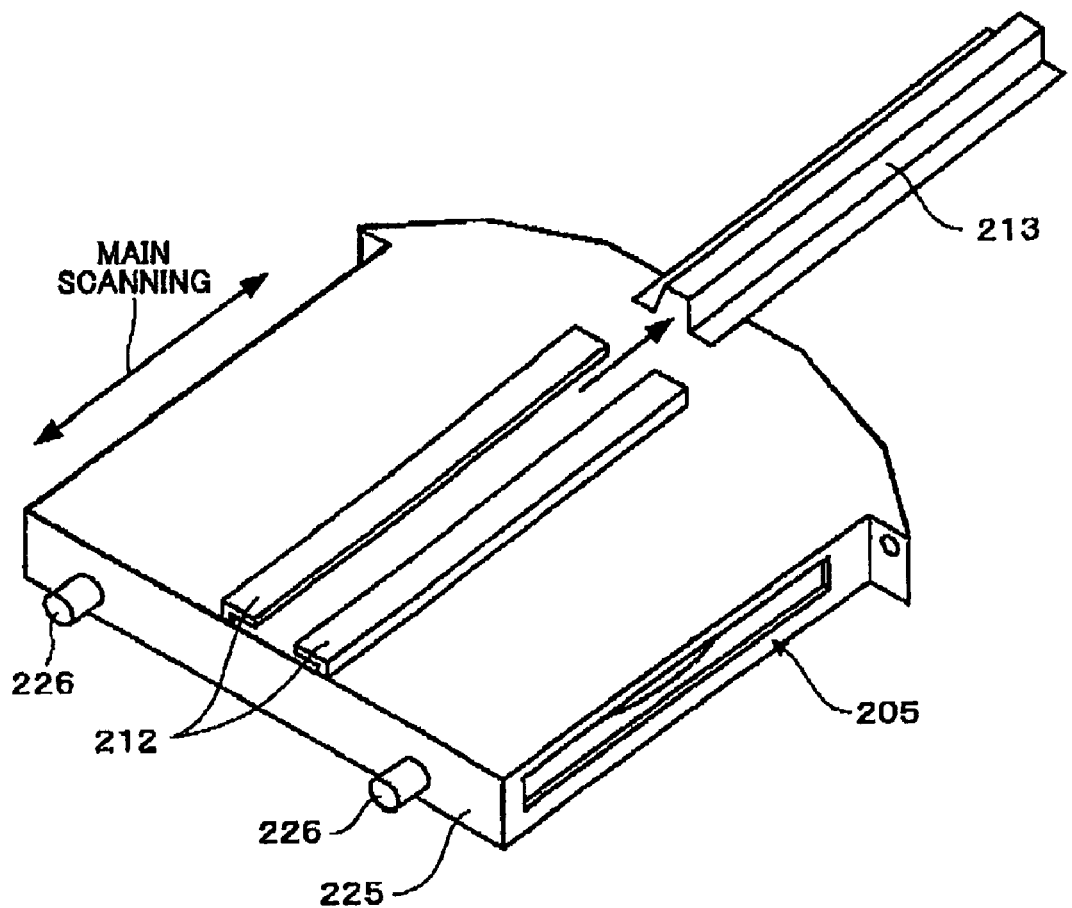
FIG. 11 is a perspective view of the housing with a warp-preventing member viewed from a bottom side.

FIG. 11 is a perspective view of the housing viewed from a backside. FIGS. 4 and 11 show an example of reinforcement to prevent the center portion of the housing 205, which is supported by being bridged between the side plates 220 and 221. Ribs 212 are integrally formed on the backside of the housing 205 so as to extend along the main scanning direction.

On the other hand, a warp-preventing member 213 is attached to a bottom metal plate 223 between the side plates 220 and 221 opposite to the ribs 212 of the housing 205. The bottom metal plate 223 is formed by bending a metal sheet or metal plate in a square shape so as to be in a hat-like shape. The warp-preventing member 213 is formed of a material having a coefficient of thermal expansion lower than that of the plastic housing 205. When attaching the housing 205, the warp-preventing member 213 is inserted into and engaged with the groove formed by the ribs 212.

By using the above-mentioned structure, the thermal expansion of the housing 205 in the main scanning direction is not restrained and, thus, no warp is generated even if there is a difference in a coefficient of thermal expansion between the warp-preventing member 213 and the housing 205, which improves rigidity with respect to warp. If the interval of the supports of the housing 205, that is, the interval between supports of the housing 205 in the main scanning direction between the side plates 220 and 221 is increased, warp of the housing due to a temperature change can be prevented, and the positioning accuracy of the above-mentioned component parts accommodated in the housing 205 can be maintained high, thereby achieving high-quality image formation.

It should be noted that the parts made of a metal sheet mentioned later including the side plates 220 and 221 and the warp-preventing member 213 are indicated by omitting the thickness thereof for the sake of simplification of the drawings.

A description will be given, with reference to FIGS. 3 and 4, of the structure of the frame 500 that supports the housing 205.

Figure 3:
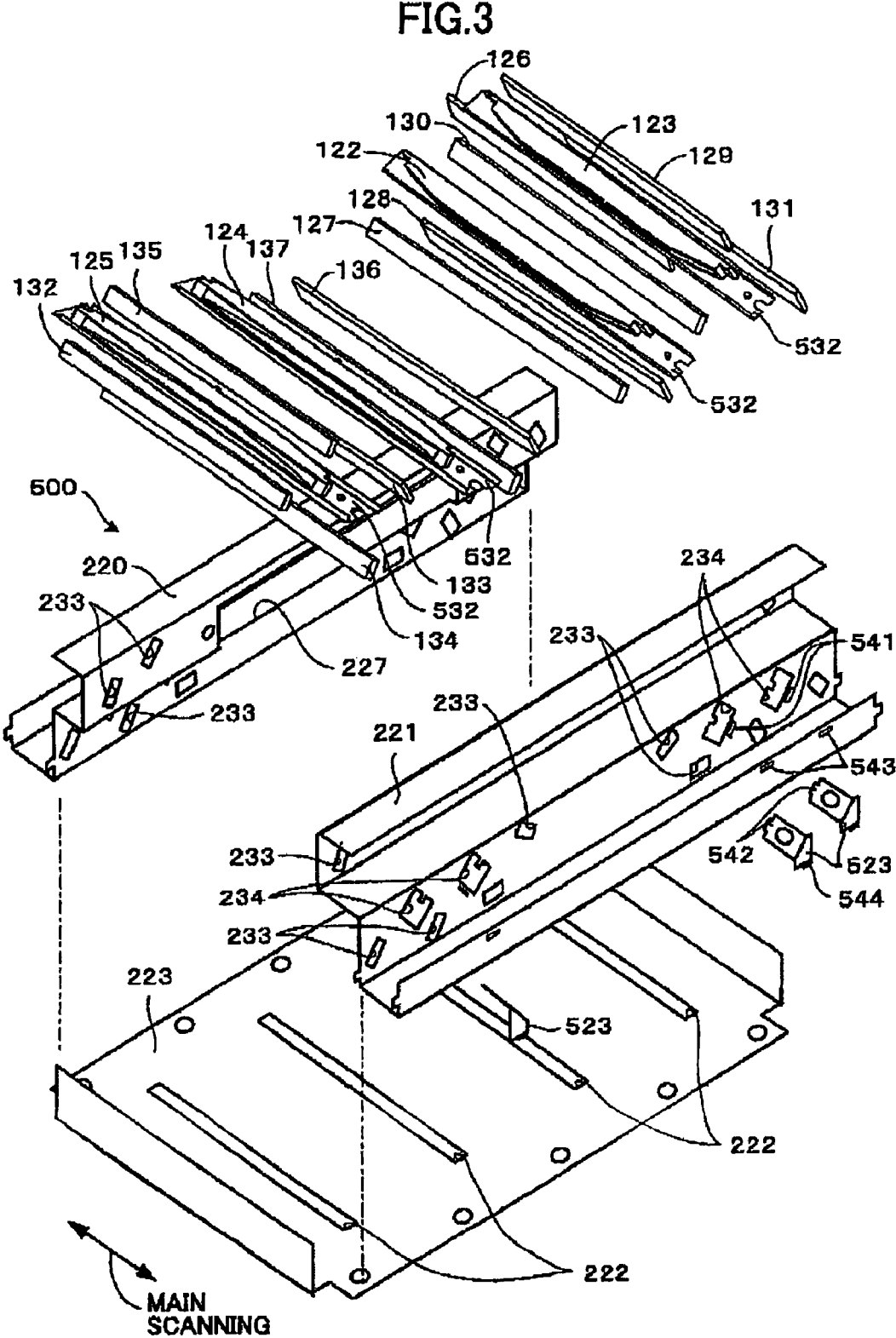
FIG. 3 is an exploded perspective view showing folding mirrors, toroidal lenses, etc., to a frame of the optical scanning apparatus shown in FIG. 1.

As shown in FIG. 3 and FIG. 4, the frame (support frame) 500 comprises a pair of side plates 220 and 221 each made of a metal sheet and a bottom metal plate 223 made of a metal sheet. The side plates 220 and 221 serve as supporting means for supporting the housing 205 facing in the main scanning direction. The side plates 220 and 221 support a plurality of reflectors serving as reflecting means (the folding mirrors 126, 127, 128, 129, 130, 131, 132, 133, 134, 135, 136 and 137). The bottom metal plate 223 serves as a coupling member or coupling means for coupling the side plates 220 and 210.

As mentioned above, the bottom metal plate 223 is formed of a metal sheet (for example, steel plate) having the same coefficient of thermal expansion as that of the metal sheet forming each of the side plates 220 and 221. Accordingly, intervals between the connecting points between the bottom metal plate 223 and each of the side plates 220 and 221 uniformly changes due to thermal expansion. Thus, there is no warp generated in each of the components and accuracy of arrangement of the above-mentioned supporting components can be maintained stably, which achieves high-quality image formation with no color shift.

Each of the side plates 220 and 221 has an upper portion bent in a channel shape and a lower portion bent in a step form. The side plates 220 and 210 are arranged to face each other in the main scanning direction and are joined to the opposite ends of the bottom metal plate 223 by screws or by caulking so that openings 233, which are formed by punching, for supporting the folding mirrors are aligned in planes perpendicular to the main scanning direction. Accordingly, the frame 500 constitutes a structural body for acquiring accuracy of arrangement of the sided plates together with the bottom metal plate 223.

Hereafter, the side plate 220 may be referred to as a rear side plate 220 and the side plate 221 is referred to as a front side plate 221. The rear side plate 220 is provided with an opening 227 into which the hosing 205 is inserted and a pair of screw holes 220a for assembling the housing 205. The front side plate 221 is provided with a reference hole 228 and an elongated hole 229 that are shown by cutting out a part of an upper wall of the side plate 221 in FIG. 4. The holes 228 and 229 are provided for positioning the housing 205 by receiving a pair of pins 226 on the housing 205.

The bottom metal plate 223 serving as a partition member is configured and arranged to separate the photosensitive drums 101, 102, 103 and 104 from the interior of the housing 205 in which the optical image forming elements are accommodated. The bottom metal plate 223 is provided with slit-like openings 222 at four positions corresponding to the irradiating positions of the light beams to the photosensitive drums.

In the present embodiment, since the above-mentioned bottom metal plate 223 is provided, the optical components such as the above-mentioned folding mirrors (reflectors or reflection mirrors) are prevented from being polluted due to scattering of the toner from the development apparatuses 604Y, 604M, 604C and 604Bk. Thus, the beams irradiating the photosensitive drums 101, 102, 103 and 104 are prevented from being reduce in beam intensity, thereby achieving stable image formation for a long time.

The pair of pins 226 are provided on a front wall surface of the housing 205. Through holes 224a are formed in a flange surface 224 that protrudes from the light source unit in left and right directions.

The housing 205 is inserted into the frame 205 through the opening 227 from outside the rear side plate 220 in a direction indicated by an arrow in FIG. 4. In this case, the pair of pins 226 are inserted into the reference hole 228 and the elongated holes 229 of the front side plate 221, respectively, so as to position the housing 205 in a plane perpendicular to the main scanning direction, and the flange surface 224 is brought into contact with the rear side plate 220 so as to position the housing 205 in the main scanning direction. Then, the screws 232 are engaged with the screw holes 220a formed in the rear side plate 220 to fix the rear side and spring bars 230 are engaged with the pins 226, which protrude by passing through the reference hole 228 and the elongated hole 229 as indicated by double-dashed chain lines in FIG. 4 so as to attach and fix the housing 205 to the frame 500.

The opposite ends of each of the spring bars 260 are engaged with cut-and-raised portions 231 formed in the front side plate 221. In this case, since the coefficient of thermal expansion of the resin of the housing 205 is larger than that of the bottom metal plate 223, the housing 205 is supported with an air gap between the front wall surface 225 and the front side plate 221 so that the front wall surface 25 is not brought into contact with the front side plate 221. The housing 205 is assembled separate from the bottom metal plate 223, which is a structural body supporting the side plates 220 and 221, and can be detachably attached freely by attaching and detaching the above-mentioned attaching parts.

As shown in FIG. 3, the toroidal lenses 122, 123, 124 and 125 are supported by and attached to the support boards 532. Each of the side plates 220 and 221 is provided with punched openings 233 and punched openings 234 so that ends of the folding mirrors 126 through 137 and ends of the support boards 532 of the toroidal lenses 122 through 125 are inserted thereto so as to support the folding mirrors 126 through 137 and the support boards 532 of the toroidal lenses 122 through 125, and the interval of the supports can be two steps by folding the side plates 220 and 221. It should be noted that the structure surrounding the toroidal lenses 122, 123, 124 and 125 and the support boards 532 is described later with reference to FIGS. 5 through 7.

The width of the housing can be minimized by having the above-mentioned structure, and the folding mirrors 129, 126, 132 and 135 that are close to the housing 205 are supported with a short span, and, thus, consideration is given so that accuracy of attachment and arrangement is not deteriorated due to a vibration and thermal deformation. In other words, in the present embodiment, the side plates 220 and 221 are located facing each other so that the interval in the main scanning direction is a plurality of steps, and the housing 205 is supported at a portion having the smallest interval. Thereby, the housing 205 can be supported with a minimum interval and the folding mirrors 129, 126, 132 and 135, which are elongated as it goes remote from the housing 205, can be a minimum length. Thus, the housing 205 can be miniaturized. Additionally, banding generated by a vibration and unevenness in intensity due to a change in a scanning pitch can be reduced, thereby achieving high-quality image formation.

Next, a description will be given, with reference to FIG. 1 and FIG. 10, of a method of supporting the folding mirrors that lead beams to synchronization detection sensor boards and end detection sensor boards.

Figure 10:
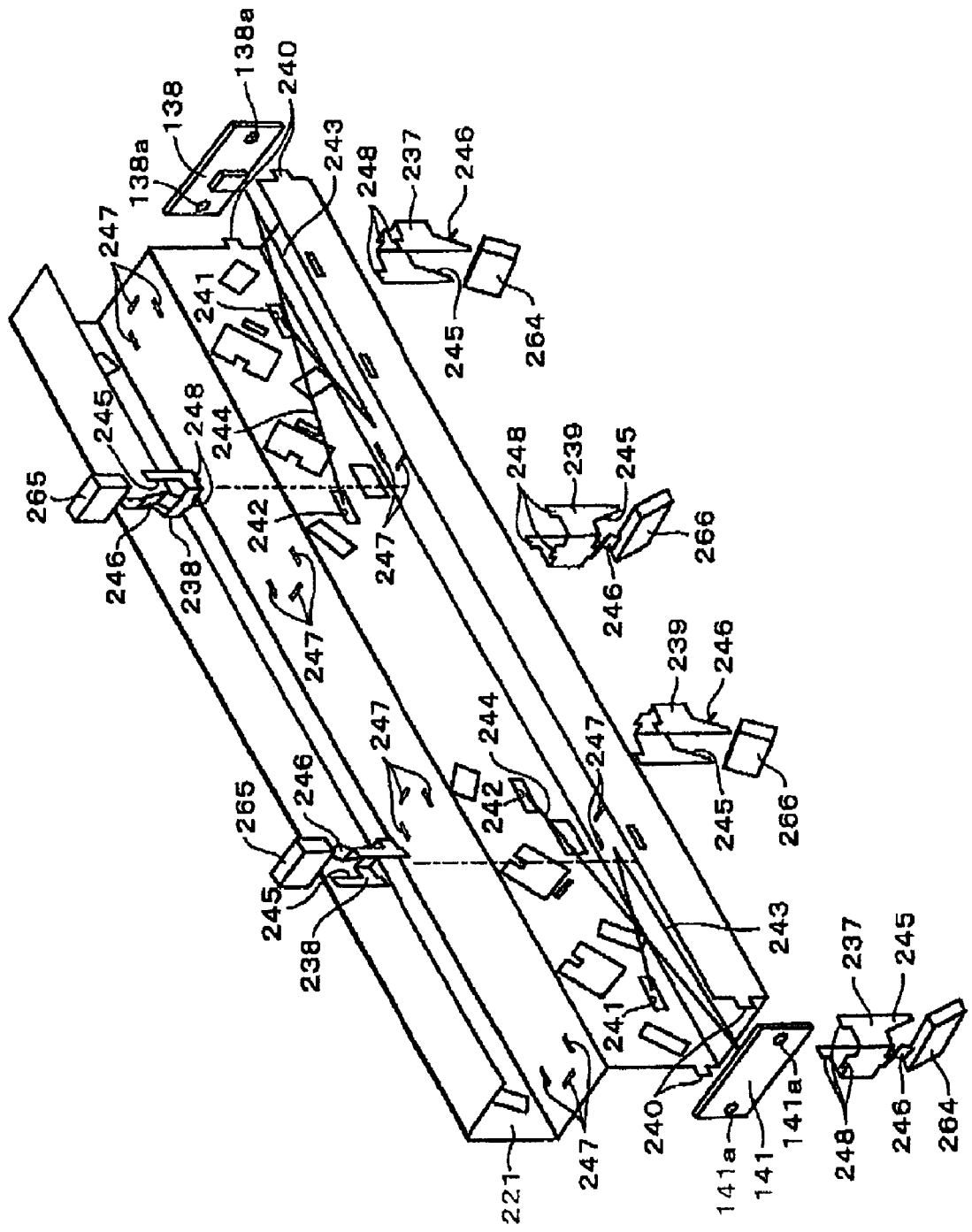
FIG. 10 is an exploded perspective view of a structure of supporting and fixing the folding mirrors that guide beams to synchronization detection sensor boards and end detection sensor boards.

As shown in FIG. 1 and FIG. 10, boards 138 and 140 (hereinafter, may be referred to synchronization detection sensor boards 138 and 140) serving as a synchronization detection sensor and boards 139 and 141 (hereinafter, may be referred to as end detection sensor boards 139 and 141) serving as an end detection sensor. The synchronization detection sensor boards 138 and 140 and the end detection sensor boards 139 and 141 detect the beams scanned in the image forming stations. The synchronization detection sensor boards 138 and 140 have a function as light detection means which detects the scanned beams.

In the present embodiment, the synchronization detection sensor boards 138 and 140 are located on an image area start side so as to acquire a write start timing based on a detection signal output by the synchronization detection sensor. The end detection sensor boards 139 and 141 are located on an image area end side so as to detect the scan time from the synchronization detection sensor and corrects the above-mentioned write start timing so that there is no shift of a scan area, which are between the optical scanning means facing the polygon mirror 106, in the main scanning direction even if there is a variation in the magnification due to a fluctuation in a wavelength or a change in radius of curvature of the fθ lenses 120 and 121. That is, in the optical scanning apparatus 600 according to the present embodiment, since image areas may extend in opposite directions when a magnification fluctuates as the scanning directions are opposite to each other, the timing is corrected so that the centers of images are aligned with each other.

The support members 237, 238 and 239 of the synchronization detection sensor boards 138 and 140, the end detection sensor boards 139 and 141 and the folding mirrors 264, 265 and 266 are attached to one of the side plates 220 and 221. The folding mirrors 244, 265 and 266 are not bridged between the side plates 220 and 221, and have an extremely short length as shown in FIG. 10. It should be noted that illustration of the folding mirrors 264, 265 and 266 is omitted in FIG. 1.

A description will now be given referring to the front side plate 221.

The synchronization detection sensor board 138 and the end detection sensor board 141 are supported by press-fitting mount holes 138a and 141a formed therein onto protrusions 240 protrudingly formed on the lower portion of the front side plate 221.

The folding mirrors 264 and 266 are located on the inner side of the front side plate 221 so as to reflect the beams passed thorough the toroidal lenses 122, 123, 124 and 125 and lead the beams to the outside of the front side plate 221 through the slit-like openings 241 and 242 formed in the front side plate 221. In FIG. 10, the reference numerals 243 and 244 indicate traces of the beams. The beam reflected by the folding mirror 266 is directly incident on the sensor boards 138 and 141, and the beam 243 reflected by the folding mirror 264 is reflected by the folding mirror 265 and changed in the direction and is incident on the sensor boards 138 and 141.

The support arrangement of the above-mentioned components (synchronization detection sensor board 140, the end detection sensor 139 and the above-mentioned folding mirrors having a short length) on the rear side plate 221 opposite to the front side plate 220 is the same as that of the front side plate 221.

The support members 237, 238 and 239 are formed by bending a metal sheet so that a mirror reception part 245, which receives a mirror reflection surface, and a plate spring part 246, which presses a backside of the mirror, are integrally formed and the folding mirrors 264, 265 and 266 are supported by being sandwiched. The support members 237 and 239 are joined by caulking by inserting the protrusions protruding from the bottom surface into the three slits formed on the step surface of the front side plate 221 so as to be fixed by being hung inside the upper step surface. The support member 238 is fixed to the upper side of the bottom surface of the front side plate in the same manner.

As mentioned above, in the present embodiment, the synchronization detection sensor boards 138 and 140 are located so that the detecting positions at which the scanned light beams are detected are outside the support positions of the folding mirrors 126 through 137, 264, 265 and 266, and the light beams scanned by the synchronization detection sensor board 138 and 140 are detected to as to acquire the image write start timing. Thus, the optical paths to the synchronization detection sensor boards 138 and 140 can be layout without interference by the folding mirrors 126 through 137, 264, 265 and 266. Additionally, the arrangement of the synchronization detection sensor boards 138 and 140 between the stations can be maintained, which suppresses a fluctuation in the synchronization detection position. Thus, the write start positions in the main scanning direction can be aligned, which results in high-quality image formation with no color shift.

Next, a description will be given, with reference to FIGS. 5 through 7, of a support housing which supports the toroidal lenses.

Figure 5:
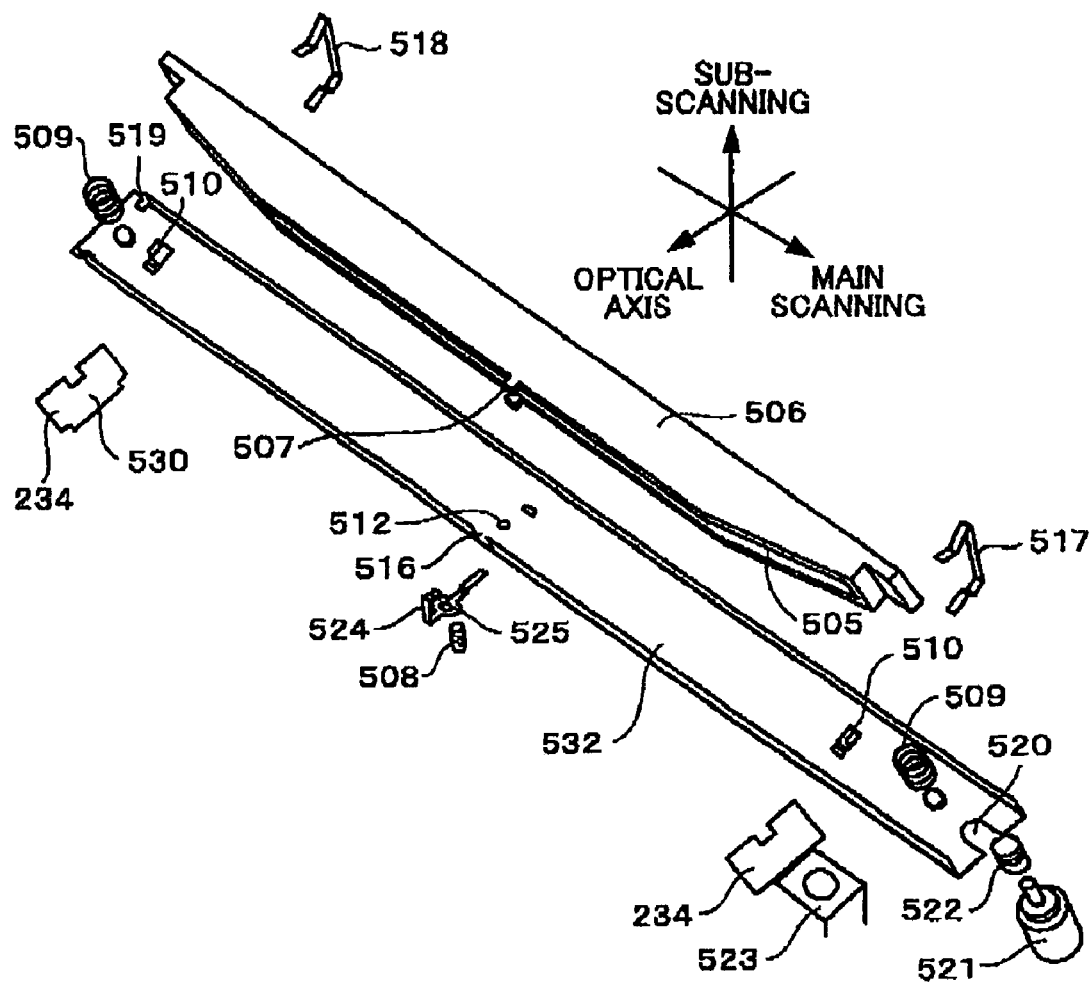
FIG. 5 is an exploded perspective view of a folding mirror assembly.

As shown in FIG. 5, the toroidal lens 505 (the same as the above-mentioned toroidal lenses 122, 123, 124 and 125 and represents those) has a rib portion, which is made of a plastic material and surrounds a lens portion. Protrusions 507 are formed in the center portion of the rib portion 506. A support plate 532, which serves as a support member for supporting the toroidal lens, is made of a metal sheet and has a channel-shaped cross section. The protrusion 507 is brought into engagement with a notch 516 formed in an upright bent portion of the support plate 532, and opposite ends of the toroidal lens 505 are brought into contact with a pair of cutout and raised portions 510, respectively, so as to position the toroidal lens 505 to the support plate 532. The toroidal lens 505 is fixed to the support plate 532 by being engaged with plate springs 517 and 518 in the state where the toroidal lens 505 is positioned on the support plate 532.

Additionally, an adjust screw 508 is engaged with a screw hole 512 formed in the central portion of the support plate 532, and a plate spring 524 is engaged with the central portion of the support plate 532 and an inner side of the rib portion 506 on the lower side so that a lower surface of the rib portion 506 is surely in contact with an end of the adjust screw 508. A hole 525 is formed in the plate spring 524 so that the adjust screw 508 penetrate therethrough.

Since the toroidal lens 505 is elongated and has a small rigidity, the toroidal lens tends to deform (warp) when a small force is applied, and also deform due to a thermal stress if there is a temperature change along a longitudinal direction of the toroidal lens 505 due to a change in an atmospheric temperature. Such a deformation caused a bend in a generating line in the sub-scanning direction, which results in a bend in the scan line. However, by engaging the toroidal lens 505 with the support plate 532 as mentioned above, the toroidal lens 505 is prevented from deforming even when a local stress is generated in or a force is applied to a part of the toroidal lens 505, which maintains the linearity of the generating line.

A plate surface of an end of the support plate 532 in a sub-scanning direction, which is attached with the toroidal lens 505, is brought into contact with a side 530 of the opening 234 formed in the rear side plate 221, and a notch 519 provided on the end is engaged with an edge of the opening 234. A compression spring 509 is provided between an upper edge of the opening 234. The other end of the support plate 532 is inserted into the opening 234 of the front side plate 220, and an end notch 520 formed on the other end of the support plate 532 is brought into engagement with an outer circumferential groove of a nut member 522 which is in engagement with an end of a shaft of a stepping motor 521.

A feed screw is formed on the shaft of the stepping motor 521 so that the nut member 522 is movable by a rotation of the shaft, which enables displacement of the support plate 532, which carries the toroidal lens 505, in the sub-scanning direction (a direction of height of the toroidal lens). In order to eliminate a backlash of the feed screw, a compression spring 509 is also provided between the support plate 532 and a side of the opening 234 of the front side plate 220.

The stepping motor 521 is joined and fixed to a bracket member 523 that is fixed to the front side plate 221. As shown in FIGS. 3 and 4, protrusions 542 of the bracket member 523 are engaged with slits 541 formed in the side plate 221 and protrusions 544 of the bracket member 523 are engaged with slits 543 formed in the bent and raised portion so as to position and fix the bracket member 523.

The toroidal lens 505 can be adjustably rotated in a plane perpendicular to the optical axis with rims of the openings 234 as supporting points in accordance with a normal and reverse rotation of the stepping motor 521. With such a rotation of the toroidal lens 505, the generating line of the toroidal lens 505 in the sub-scanning direction inclines, and, thereby, the scan line as an image forming position of the toroidal lens 505 is inclined. In the present embodiment, a direction of the supporting points of rotation of each toroidal lens 505 is coordinate with one of the toroidal lenses (122, 123, 124) other than that of black.

The toroidal lens 505 is supported by an edge of the cutout and raised portion 510 of the support plate 532 at the opposite ends thereof and by an end of the adjust screw 506 at the center thereof. In a case where an amount of protrusion of the adjust screw 508 is not enough to reach the edge of the cutout and raised portion 510, the generating line 512 of the toroidal lens is bent as a convex downward. Contrary, if the amount of protrusion exceeds, the toroidal lens bends as a convex upward. Accordingly, by adjusting the amount of protrusion of the adjustment screw 508, the focus line of the toroidal lens 505 can be bent in the sub-scanning direction, which corrects a bend in the scan line.

As mentioned above, since the bend of the scan line is generated due to the beam being obliquely incident on the deflection surface, the above-mentioned correcting mechanism is provided to all stations so as to coordinate the bend and direction among the scan lines by bending the toroidal lens 505 in a direction of canceling a difference between the stations.

A description will now be given, with reference to FIGS. 6A and 6B, of a method of supporting and fixing the long scale folding mirror which is supported by being bridged between the side plates 220 and 221.

Figure 6A:
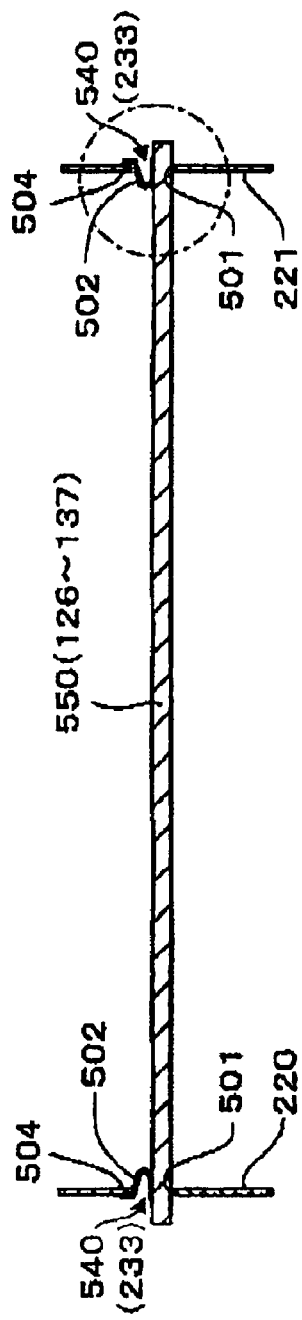
FIG. 6A is a cross sectional view of the folding mirror attached to the frame.
Figure 6B:
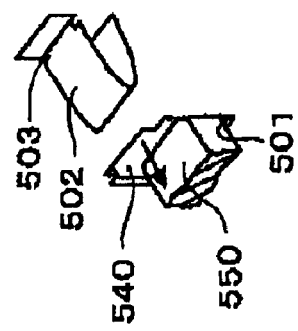
FIG. 6B is a perspective view of an attaching part of the folding mirror.
Figure 7:
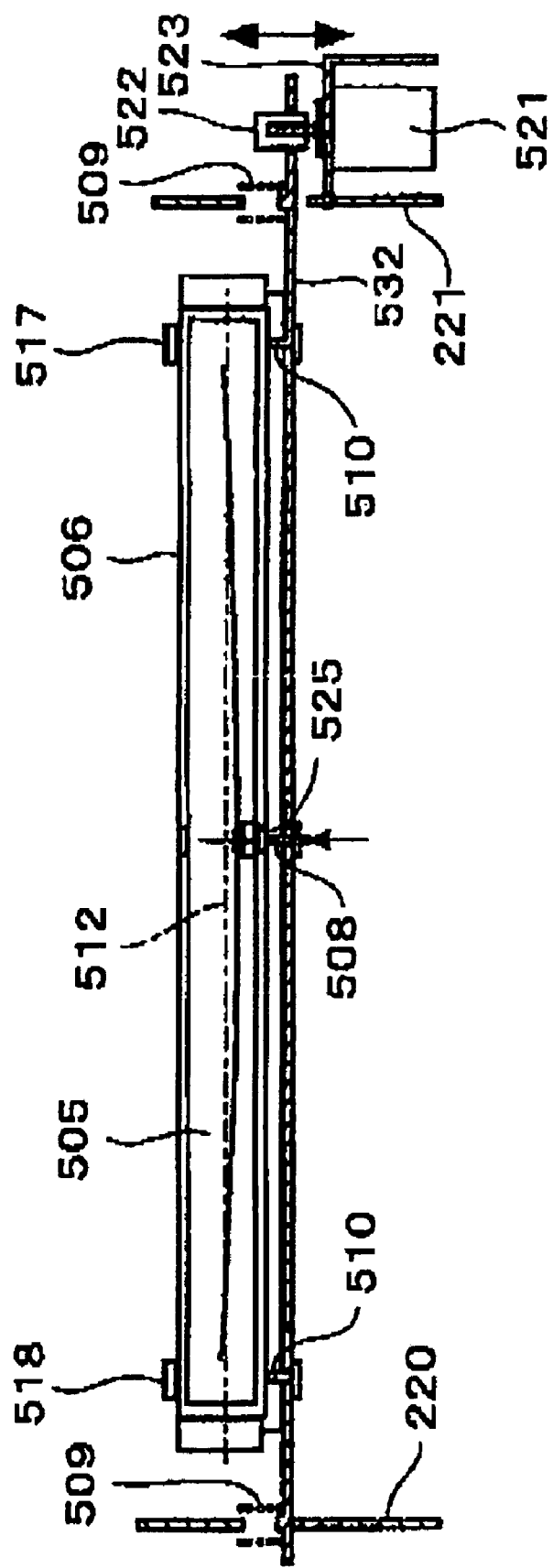
FIG. 7 is a side view of a toroidal lens viewed in a direction of an optical axis.

The folding mirror 550 shown in FIG. 6A is the same as the folding mirrors 126 through 137 serving as reflecting means or a reflection mirror as indicated by the parenthesized reference numerals, and represents those mirrors. The method of supporting and fixing the folding mirror 550 mainly differs from that of the folding mirrors 264, 265 and 166 shown in FIG. 10 in that plate springs 502 serving as pressing members or elastic members are used instead of the support members 237, 238 and 239 and is supported by punched edges of openings 540 (similar to the openings 233 shown in FIGS. 3 and 4 as indicated by the parenthesized reference numeral) for supporting the folding mirror.

In the present embodiment, the reflecting surface side of the folding mirror 550 (126 through 137) is brought into contact with a side 501 of the punched edge formed in the opening 540 by known plastic forming (press work), and the wedge-like plate spring 502 is inserted in between the backside of the folding mirror 550 and the opposite sides of the side plates 220 and 221 from outside, and notches 503 formed in the plate spring 502 is brought into engagement with the edges 504 of the side plates 220 and 221 so as to support opposite ends of the folding mirror 550. The wedge-like plate springs 502 are all in the same shape, and are used as common parts.

According to the present embodiment, the folding mirror 550 is supported by the punched edges of the openings 540 (233) formed in the sheet metal side plates 220 and 221, which edges are perpendicular to the surfaces of the side plates 220 and 221, and the support of the folding mirror 550 is made in the direction perpendicular to the surface of the side plates 220 and 221, and, thereby, an accurate positioning can be achieved without receiving an influence of a flatness of the side plates 220 and 221 and there is no influence of a vibration propagating through the side plates 220 and 221. Thus, unevenness in intensity due to banding or a fluctuation in the scan pitch can be reduced, which achieves high-quality image formation.

The present embodiment has the above-mentioned advantages as compared to the method of supporting and fixing the folding mirror shown in FIG. 11. Additionally, since the present embodiment commonly uses one kind of plate spring 502 without using the support members 237, 238 and 239 having a more complex shape than the plate spring 502, a cost is reduced. Further, a positional accuracy of the openings 540 (233) formed in each of the side plates 220 and 221 can satisfy sufficiently the required accuracy by using the current plastic forming (press work) technique.

Second Embodiment

A description will be given, with reference to FIGS. 13 through 16, of a second embodiment of the present invention.

The second embodiment differs from the first embodiment only in that a color image forming apparatus 720 equipped with an optical scanning apparatus 700 is provided instead of the color image forming apparatus 620 equipped with the optical scanning apparatus 600.

The color image forming apparatus 720 differs from the color image forming apparatus 620 in that the optical scanning apparatus 700 is provided instead of the optical scanning apparatus 600. Thus, the color image forming apparatus 720 according to the second embodiment has the same structure and operation as the color image forming apparatus 620 according to the first embodiment except for the optical scanning apparatus. Accordingly, a description will be given below, with reference to FIG. 13 through FIG. 16, of a structure and an operation of the optical scanning apparatus, which differ from that of the optical scanning apparatus of the first embodiment.

The optical scanning apparatus 700 differs from the optical scanning apparatus 600 of the first embodiment in that the optical scanning apparatus 700 includes an optical scanning unit 700A, which corresponds to image forming stations of yellow and magenta, and an optical scanning unit 700B, which corresponds to image forming stations of cyan and black, the optical scanning units 700A and 700B being arranged so that scanning directions thereof are parallel to each other.

Figure 16:
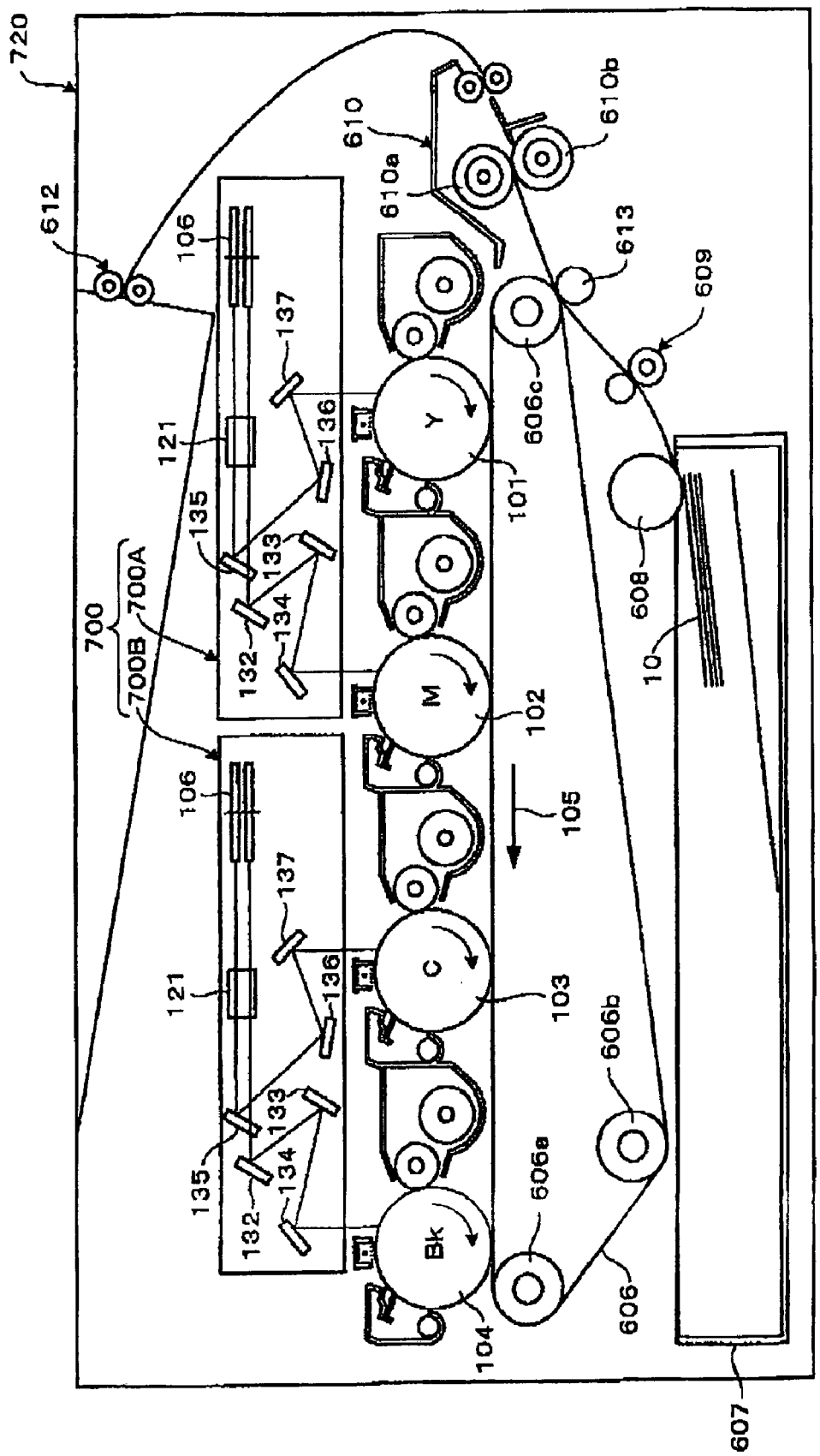
FIG. 16 is an illustration of an entire color image forming apparatus equipped with the optical scanning apparatus shown in FIG. 14.

The four photosensitive drums 101, 102, 103 and 104 are arranged at equal intervals along the direction 105 of movement of the intermediate transfer belt 606 as shown in FIG. 16 so as to form a color image by sequentially transferring different color images to overlap with each other on the intermediate transfer belt 606.

The optical scanning apparatus 700, which scans photosensitive drums 101, 102, 103 and 104 is constructed by dividing the optical scanning system into the two units which are the optical scanning units 700A and 700B, and scans light beams by the polygon mirrors 106 as deflecting means for each light beam.

Since the polygon mirrors 106 rotate in the same direction, images are written so that write start positions match each other. Accordingly, the scanning directions of the image forming stations are the same. Thus, there is no end detection sensor, and only synchronization detection sensor boards 138 and 140, which serve as optical detecting means having the same function as that of the first embodiment, are provided and arranged.

In the present embodiment, a pair of semiconductor lasers mentioned later are arranged with respect to the photosensitive drums 101, 102, 103 and 104, respectively, so that two lines are simultaneously scanned by shifting by on pitch in the sub-scanning direction in accordance with a recording density.

Since the structure of each of the optical scanning units 700A and 700B is the same, the optical scanning unit 700B will be explained below. It should be noted that component parts that have the same function and configuration as the parts of the first embodiment are given the same numerals, and description will be omitted.

The light source units 109 and 110 are attached to engaging holes 807 formed in the wall of the housing 805 at different heights so that the light source unit 109 is made correspond to the lower portion of the polygon mirror 106 and the light source unit 110 is made correspond to the upper portion of the polygon mirror 106. Each of the difference in height between the light source units 109 and 110 and the difference in height between the upper portion and the lower portion of the polygon mirror 106 is set to about 6 mm.

In the present embodiment, each light source unit includes a pair of semiconductor lasers as the same as the first embodiment so as to simultaneously scan two lines by shifting by one pitch in the sub-scanning direction in accordance with a recording density. The beam 203 from the light source unit 109 is incident on the lower portion of the polygon mirror 106, and after being deflected by the lower portion of the polygon mirror 106, the beam passes through the lower lens of the fθ lens 121 and changed in its direction by the folding mirror 132 in obliquely downward direction. Then, the beam is incident on the toroidal lens 125, and reaches the photosensitive drum 104 through the folding mirrors 133 and 134, which forms spot images to sequentially form an electrostatic image. Thereby, a cyan image is formed by the third image forming station.

Moreover, the light source unit 109 is located by being radially shifted in the main scanning direction with respect to the light source unit 109 from an intersection of an extending line of the optical axis of the fθ lens 121 and the deflection plane of the polygon mirror 106. The beam 204 from the light source unit 110 is incident on the upper portion of the polygon mirror 106 through the cylinder lens 116.

The beam 203 deflected by the polygon mirror 106 passes through the upper lens of the fθ lens 121 and changed in its direction by the folding mirror 135 in obliquely downward direction. Then, the beam is incident on the toroidal lens 124, and reaches the photosensitive drum 103 through the folding mirrors 136 and 137, which forms spot images to sequentially form an electrostatic image. Thereby, a black image is formed by the fourth image forming station.

The housing 805 is made of a plastic and accommodates the light source units 109 and 110 through the fθ lens 121 integrally as the same as the housing 205 of the first embodiment. The housing 805 of the other optical scanning unit 700A has the same structure. An upper opening of the housing 805 is airtightly closed by a cover 302. The scanned beams exit through an opening 808 formed on a vertical wall on the left side in the figure. The housing 805 for the first and second stations has the same structure as the housing 805 for the third and fourth stations except for the light source units 107 and 108 being accommodated instead of the light source units 109 and 110.

Other detailed structures of the housing 805 are the same as the housing 205 of the first embodiment, and description thereof will be omitted by giving the same reference numerals with the number 600 added thereto and giving the same designations.

Figure 15:
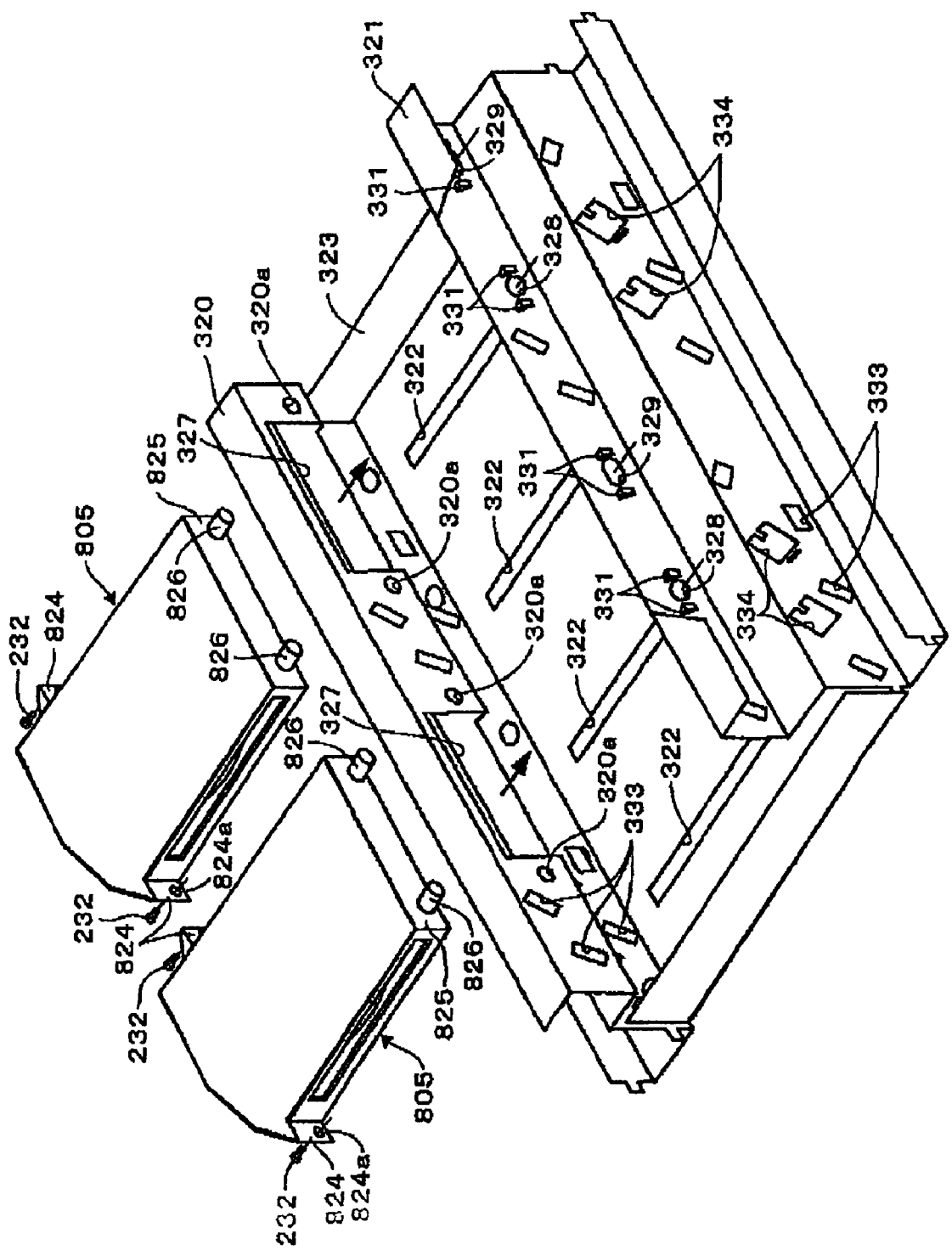
FIG. 15 is an exploded perspective view showing folding mirrors, toroidal lenses, etc., to a frame of the optical scanning apparatus shown in FIG. 14.

The frame structure shown in FIG. 15 is basically the same as that of the first embodiment. That is, each of the side plates 320 and 321, which is formed by a metal sheet bent in a channel shape, as a pair of supporting means is bent in a step form and arranged facing each other in the main scanning direction. The side plates 320 and 321 are joined to the opposite ends of the bottom metal plate 323 by screws or by caulking so that openings 333, which are formed by punching, for supporting the folding mirrors are aligned in planes perpendicular to the main scanning direction. Accordingly, the frame structure constitutes a structural body for acquiring accuracy of arrangement of the sided plates 320 and 321. The two housings 805 are supported by the common frame.

The bottom metal plate 323 is provided with slit-like openings 322 at positions corresponding to the irradiating positions of the light beams on the photosensitive drums 101, 102, 103 and 104. A pair of pins 826 are provided on a front wall surface 825 of the housing 805, and a though holes 824a are provided in a flange surface 824 protruding from the light source attaching part. The housings 805 are inserted into respective openings 327 of the rear side plate 320 in a direction indicated by arrows.

In this case, a pair of pins 826 are inserted into a reference hole 328 and an elongated holes 329 of the front side plate 321, respectively, so as to position the housing 805 in a plane perpendicular to the main scanning direction, and the flange surface 824 is brought into contact with the rear side plate 320 so as to position the housing 805 in the main scanning direction. Then, the screws 232 are engaged with the screw holes 320a formed in the rear side plate 320 to fix the rear side and spring bars (spring bars 230 shown in FIG. 4) are engaged with the pins 826, which protrude by passing through the reference hole 228 and the elongated hole 229 so as to attach and fix the housing 805.

AS mentioned above, the housings 805 are assembled separate from the structure body holding the side plates 320 and 321, and can be detachably attached individually.

Other detailed structures of the side plates 320 and 321 and the bottom metal plate 323 are substantially the same as the side plates 220 and 221 and the bottom metal plate 223. Thus, parts that correspond to the parts of the first embodiment are given the same reference numerals with the number 100 added thereto and mentioned also given the same designations, and descriptions thereof will be omitted. The bottom metal plate 323 is provided with slit-like openings 322 at positions corresponding to the irradiating positions of the light beams on the photosensitive drums 101, 102, 103 and 104. A pair of pins 826 are provided on a front wall surface 825 of the housing 805, and a though holes 824a are provided in a flange surface 824 protruding from the light source attaching part. The housings 805 are inserted into respective openings 327 of the rear side plate 320 in a direction indicated by arrows.

In this case, a pair of pins 826 are inserted into a reference hole 328 and an elongated holes 329 of the front side plate 321, respectively, so as to position the housing 805 in a plane perpendicular to the main scanning direction, and the flange surface 824 is brought into contact with the rear side plate 320 so as to position the housing 805 in the main scanning direction. Then, the screws 232 are engaged with the screw holes 320a formed in the rear side plate 320 to fix the rear side and spring bars (spring bars 230 shown in FIG. 4) are engaged with the pins 826, which protrude by passing through the reference hole 228 and the elongated hole 229 so as to attach and fix the housing 805.

AS mentioned above, the housings 805 are assembled separate from the structure body holding the side plates 320 and 321, and can be detachably attached individually.

Other detailed structures of the side plates 320 and 321 and the bottom metal plate 323 are substantially the same as the side plates 220 and 221 and the bottom metal plate 223. Thus, parts that correspond to the parts and members of the first embodiment are given the same reference numerals with the number 100 added thereto and also given the same designations, and descriptions thereof will be omitted.

According to the technical contents of the above-mentioned first and second embodiments, a person skilled in the art can easily conceive a reinforcing structure to prevent the housing 805e which is supported by being bridged between the side plates 320 and 321, from being bent in the center portion thereof, a method of supporting the folding mirrors guiding the beams to the synchronization detection sensor boards 138 and 140, a method of supporting the toroidal lenses 124 and 125, and a structure and operation of the support housing which supports the toroidal lenses 124 and 125. Thus, further descriptions thereof will be omitted to avoid duplicate descriptions. It is a matter of course that a variation shown in FIG. 6 is applicable.

Although the two-stage polygon mirror 106 is used in the above-mentioned embodiments, the same effects are obtained by sharing a frame structure body by a plurality of stations.

Although the description has been given of the tandem-type image forming apparatus which transfers images onto a sheet-like recording medium at once after transferring the images onto the intermediate transfer member in the above-mentioned embodiments, the present invention is applicable to a direct transfer tandem type color image forming apparatus which sequentially transfers and overlaps images onto a sheet-like recording medium being carried by an endless belt.

According to the above-mentioned embodiments of the present invention, the optical scanning apparatus comprises: the pair of side plates (support members) that are arranged facing each other in the main scanning direction so as to hold the housing; and the support mechanism that supports the folding mirrors (reflectors) by bridging the folding mirror between the side plates and also couples the support members to each other, and wherein the relative positions of the folding mirrors are arranged and aligned in a cross-sectional plane perpendicular to the main scanning direction between the side plates. Thus, deformation or distortion of the image (parallelogram distortion) due to relative displacement of the side plates (support members) in the cross-sectional plane perpendicular to the main scanning direction can be reduced. Thereby, the accuracy of the irradiating positions of the light beams on photosensitive drums (image carriers) can be stably maintained high, which permits high-quality image formation for a long time.

Additionally, since the pair of side plates (support members) are not supported by the housing, the housing can be detachably attached without disassembling the side plates. Thus, replacement and assembly of the structural elements (component parts) inside the housing can be easily performed, which improves productivity and maintenancability. Further, since the arrangement of the structural elements can be common independent of the intervals between the stations, the image forming optical system from the light source unit to the image forming element closest to the polygon mirror (deflection mirror) can be accommodated in a single housing and the folding mirrors (reflectors) can be supported by the pair of side plates (support members), which may eliminated waste time and labor to remake the housing when changing the intervals between the stations as in done conventionally. Additionally, by enabling flexible structure due to mere remaking of the support members, the structural elements may be commonly used with other types of image forming apparatuses having different intervals between stations, which reduces a development cost and improves productivity.

The present invention is not limited to the specifically disclosed embodiments, and variations and modifications may be made without departing from the scope of the present invention.

The present application is based on Japanese priority application No. 2005-044538 filed Feb. 21, 2005, the entire contents of which are hereby incorporated herein by reference.

What is claimed is:

1. An optical scanning apparatus comprising:
    a housing including:
        a plurality of light sources;
        at least one deflection mirror deflecting light beams from the light sources; and
        at least one optical image forming element that forms images by focusing the light beams scanned by the deflection mirror,
        wherein the light sources, the deflection mirror and the optical image forming element are accommodated in and integrally supported by said housing;
    a plurality of image forming stations that lead the light beams exiting said housing to a plurality of image carriers, respectively;
    a pair of support members that face each other to support said housing in a main scanning direction so as to position a plurality of reflectors corresponding to the respective image forming stations in a plane perpendicular to the main scanning direction; and
    a support frame that couples said pair of support members to maintain relative positions of said support members to each other,
    wherein said housing is supported by said pair of support members by being bridged over said pair of support members so that said housing is positioned in the plane perpendicular to the main scanning direction at one of said pair of support members and positioned in the scanning direction by contacting a flange surface of said housing with the other of said pair of support members.

2. The optical scanning apparatus as claimed in claim 1, wherein each of said pair of support members is formed of a metal sheet, and said reflectors are supported by edge surfaces of the metal sheets perpendicular to the surfaces of the metal sheets.

3. The optical scanning apparatus as claimed in claim 2, wherein said edge surfaces are formed by punching the metal sheets.

4. The optical scanning apparatus as claimed in claim 1, wherein said support frame includes a coupling member formed of a material having the same coefficient of thermal expansion as that of said support members.

5. The optical scanning apparatus as claimed in claim 1, wherein said housing is supported so that positioning of said housing in the main scanning direction is performed by one of said pair of support members, and the other of said pair of support members supports said housing free from restraint in the main scanning direction.

6. The optical scanning apparatus as claimed in claim 1, wherein said support frame includes a partition member located between an interior of said support frame and said image carriers, and openings are formed in said partition member to pass the light beams traveling toward said image carriers therethrough.

7. The optical scanning apparatus as claimed in claim 1, wherein each of said support members has a step form so that there are different distances formed between said support members facing each other, and said housing is supported by portions of said support members having a smallest distance therebetween.

8. The optical scanning apparatus as claimed in claim 7, wherein an optical detector is provided to said support members so as to detect the light beams at detecting positions located outside support positions of said reflectors so that a write start timing is set in accordance with a result of detection of the optical beams scanned by the deflection mirror.

9. The optical scanning apparatus as claimed in claim 1, wherein a warp-preventing member having a coefficient of thermal expansion smaller than that of said housing is provided to said housing, said warp-preventing member being in engagement with said housing free from restraint in the main scanning direction.

10. The optical scanning apparatus as claimed in claim 1, wherein said reflectors are reflection mirrors.

11. An optical scanning apparatus comprising:
    a plurality of housings, each housing including:
        a plurality of light sources;
        at least one deflection mirror deflecting light beams from the light sources; and
        at least one optical image forming element that forms images by focusing the light beams scanned by the deflection mirror,
        wherein the light sources, the deflection mirror and the optical image forming element are accommodated in and integrally supported by said housing;
    a plurality of image forming stations corresponding to said housings, each of the image forming stations leading the light beams exiting each of said housings to a plurality of image carriers, respectively;

a pair of support members that face each other to support said housings in a main scanning direction so as to position a plurality of reflectors corresponding to the respective image forming stations in a plane perpendicular to the main scanning direction; and a support frame that couples said support members to maintain relative positions of said support members to each other, wherein each of said housings is supported by said pair of support members by being bridged over said pair of support members so that each of said housings is positioned in the plane perpendicular to the main scanning direction at one of said pair of support members and positioned in the scanning direction by contacting a flange surface of each of said housings with the other of said pair of support members.

12. The optical scanning apparatus as claimed in claim 11, wherein each of said housings is supported so that positioning of each of said housings in the main scanning direction is performed by one of said pair of support members, and the other of said pair of support members supports each of said housings free from restraint in the main scanning direction.

13. An image forming apparatus for forming a color image, comprising:

a optical scanning apparatus comprising:

a housing including:

a plurality of light sources;

at least one deflection mirror deflecting light beams from the light sources; and at least one optical image forming element that forms images by focusing the light beams scanned by the deflection mirror, wherein the light sources, the deflection mirror and the optical image forming element are accommodated in and integrally supported by said housing;

a plurality of image forming stations that lead the light beams exiting said housing to a plurality of image carriers, respectively;

a pair of support members that face each other to support said housing in a main scanning direction so as to position a plurality of reflectors corresponding to the respective image forming stations in a plane perpendicular to the main scanning direction; and a support frame that couples said pair of support members to maintain relative positions of said support members to each other, wherein said housing is supported by said pair of support members by being bridged over said pair of support members so that said housing is positioned in the plane perpendicular to the main scanning direction at one of said pair of support members and positioned in the scanning direction by contacting a flange surface of said housing with the other of said pair of support members; and an image forming part that develops electrostatic latent images formed on the image carriers by said optical scanning apparatus by applying different color toners corresponding to respective image carriers, and forms the color image by sequentially transferring and overlapping the developed toner images onto a transfer member so as to form the color image.

14. The image forming apparatus for forming a color image as claimed in claim 13, wherein said transfer member is an intermediate transfer member so that the color image developed by the different color toners and formed on the intermediate transfer member is transferred onto a sheet-like recording medium.

15. The image forming apparatus for forming a color image as claimed in claim 13, wherein said transfer member is a sheet-like recording medium carried by a movable carrier.

* * * * *